(12) United States Patent  
Orito

(10) Patent No.: US 7,209,984 B2
(45) Date of Patent: Apr. 24, 2007

(54) PRINTING SYSTEM FOR SELECTIVELY ERASING PRINT DATA SET IN SPOOL REGION WHEN TOTAL DATA SIZE OF PRINT DATA SETS EXCEEDS PRESET REFERENCE DATA SIZE

(75) Inventor: Yoshiko Orito, Bisai (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 534 days.

(21) Appl. No.: 10/796,038

(22) Filed: Mar. 10, 2004

(65) Prior Publication Data

US 2004/0169884 A1   Sep. 2, 2004

Related U.S. Application Data

(62) Division of application No. 09/649,516, filed on Aug. 29, 2000, now Pat. No. 6,932,523.

(30) Foreign Application Priority Data

Aug. 31, 1999 (JP) ............... P11-245909
Aug. 31, 1999 (JP) ............... P11-245910
Aug. 31, 1999 (JP) ............... P11-245911
Sep. 7, 1999  (JP) ............... P11-252475

(51) Int. Cl.
    *G06F 3/00*  (2006.01)
(52) U.S. Cl. .............. 710/52; 710/54; 710/15
(58) Field of Classification Search ........... 710/52, 710/54, 15; 726/34; 702/186; 400/61; 358/1.14, 1.15, 1.18, 1.16, 1.13
    See application file for complete search history.

(56) References Cited

U.S. PATENT DOCUMENTS 4,847,766 A    7/1989 McRae et al.
4,915,546 A    4/1990 Kobayashi et al.
5,060,154 A   10/1991 Duncan
5,187,750 A    2/1993 Behera
5,347,646 A    9/1994 Hirosawa et al.
5,481,698 A    1/1996 Itoh et al.
5,537,543 A    7/1996 Itoh et al.
5,537,626 A    7/1996 Kraslavsky et al.
5,557,736 A    9/1996 Hirosawa et al.
5,657,461 A    8/1997 Harkins et al.
5,819,240 A   10/1998 Kara ...................... 705/408
5,873,659 A  * 2/1999 Edwards et al. ............ 400/61
5,923,405 A    7/1999 Kayama ................... 355/29

(Continued)

FOREIGN PATENT DOCUMENTS

JP    A-05-224846    9/1993

(Continued)

*Primary Examiner*—Le Hien Luu
(74) *Attorney, Agent, or Firm*—Oliff & Berridge, PLC

(57) ABSTRACT

A printing system includes a printer and computers connected by an network. A mail server is provided for transmitting notification data from the printer to the computers in the form of an email message. Print data stored in the printer is erased once the print data has been used for reprint operations a certain amount of times. If the amount of print data stored in the printer exceeds a reference size, then print data sets are selected for erasure based on predetermined conditions. Data stored in the printer can be retrieved from the printer and amended at the computer.

8 Claims, 20 Drawing Sheets

U.S. PATENT DOCUMENTS

| | | | |
|---|---|---|---|
| 5,970,228 A * | 10/1999 | Nezu | 726/34 |
| 6,089,765 A | 7/2000 | Mori | 400/61 |
| 6,157,465 A | 12/2000 | Suda et al. | |
| 6,226,097 B1 * | 5/2001 | Kimura | 358/1.14 |
| 6,313,921 B1 * | 11/2001 | Kadowaki | 358/1.15 |
| 6,324,521 B1 | 11/2001 | Shiota et al. | |
| 6,433,882 B1 * | 8/2002 | Mori et al. | 358/1.13 |
| 6,473,192 B1 * | 10/2002 | Kidani et al. | 358/1.14 |
| 6,473,812 B2 | 10/2002 | Motoyama | |
| 6,487,521 B1 * | 11/2002 | Carney | 702/186 |
| 6,535,294 B1 | 3/2003 | Arledge et al. | |
| 6,621,592 B1 * | 9/2003 | Takayama et al. | 358/1.16 |
| 6,687,684 B1 | 2/2004 | Whitehouse et al. | 705/408 |
| 6,813,038 B1 * | 11/2004 | Kadowaki | 358/1.18 |
| 6,825,941 B1 * | 11/2004 | Nguyen et al. | 358/1.15 |
| 2002/0015166 A1 | 2/2002 | Wakai et al. | |
| 2004/0083422 A1 | 4/2004 | Duan et al. | |

FOREIGN PATENT DOCUMENTS

| | | |
|---|---|---|
| JP | A 06-214903 | 8/1994 |
| JP | A 08-044255 | 2/1996 |
| JP | A-08328778 | 12/1996 |
| JP | A-09-006657 | 1/1997 |
| JP | A 10-040186 | 2/1998 |
| JP | A 11-039259 | 2/1999 |
| JP | A-11-119925 | 4/1999 |
| JP | A 11-143802 | 5/1999 |
| JP | A-2000-137591 | 5/2000 |
| JP | A-2000-194521 | 7/2000 |

* cited by examiner

FIG. 14

| PRINT MANAGEMENT INFORMATION | | | | |
|---|---|---|---|---|
| PRINT DATA SET ID | SIZE OF DATA SET | WHEN SPOOLED | WHEN LAST PRINTED | WHEN DELETION ACCEPTABLE |
| DATA a | 1 MB | 1999/08/23 11:00 | 1999/08/23 15:03 | 1999/08/24 17:00 |
| DATA b | 3 MB | 1999/08/23 12:21 | 1999/08/23 13:15 | 1999/08/23 15:00 |
| DATA c | 10 MB | 1999/08/23 13:12 | 1999/08/23 13:16 | 1999/08/30 10:00 |
| DATA d | 5 MB | 1999/08/23 14:32 | 1999/08/23 14:50 | 1999/08/24 16:30 |
| DATA e | 8 MB | 1999/08/23 15:15 | 1999/08/23 15:20 | 1999/08/24 15:00 |
| ⋮ | ⋮ | ⋮ | ⋮ | ⋮ |
| ⋮ | ⋮ | ⋮ | ⋮ | ⋮ |

FIG. 21

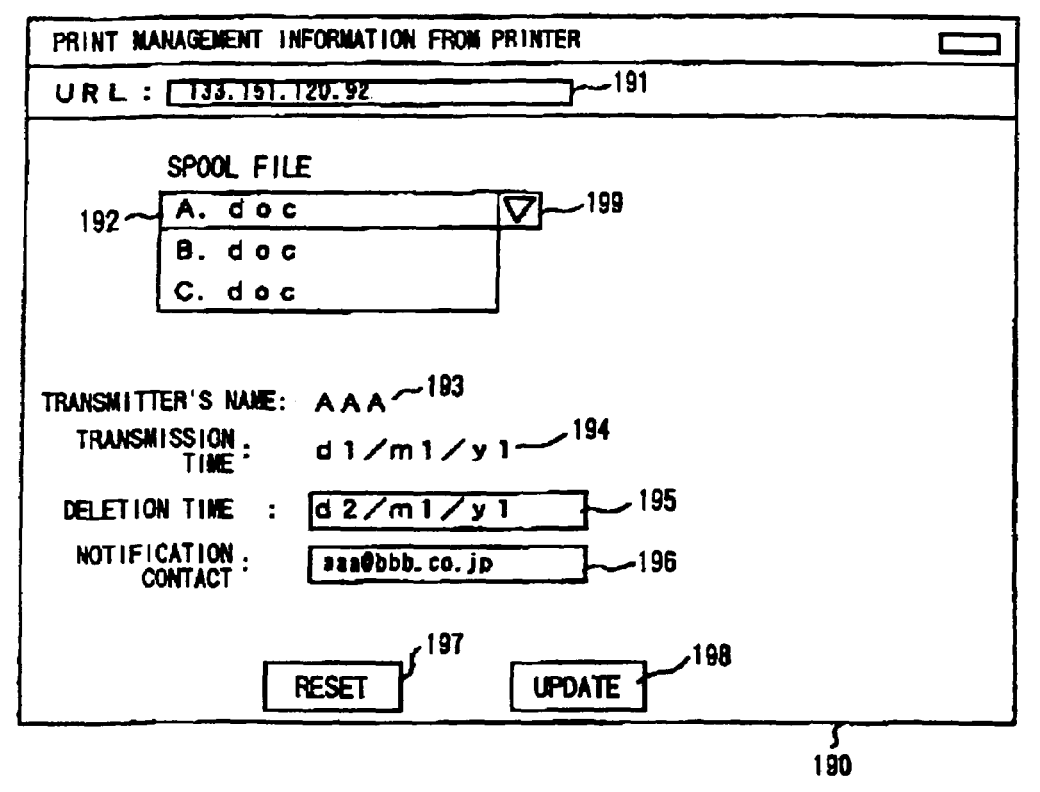

```
┌─────────────────────────────────────────────────┐
│ PRINT MANAGEMENT INFORMATION FROM PRINTER    □  │
│ ┌─────────────────────────────┐                 │
│ U R L : │ 133.151.120.92      │──191            │
│ └─────────────────────────────┘                 │
│                                                 │
│            SPOOL FILE                           │
│       ┌──────────────────┐                      │
│  192──│ A. d o c      ▽ │──199                  │
│       │ B. d o c         │                      │
│       │ C. d o c         │                      │
│       └──────────────────┘                      │
│                                                 │
│                           ─193                  │
│   TRANSMITTER'S NAME:  A A A                    │
│       TRANSMISSION :   d 1 / m 1 / y 1 ──194    │
│            TIME                                 │
│       DELETION TIME :  │ d 2 / m 1 / y 1 │─195  │
│       NOTIFICATION :   │ aaa@bbb.co.jp   │─196  │
│          CONTACT                                │
│                         ─197         ─198       │
│                    ┌───────┐     ┌───────┐      │
│                    │ RESET │     │ UPDATE│      │
│                    └───────┘     └───────┘      │
└─────────────────────────────────────────────────┘
                                          190
```

PRINTING SYSTEM FOR SELECTIVELY ERASING PRINT DATA SET IN SPOOL REGION WHEN TOTAL DATA SIZE OF PRINT DATA SETS EXCEEDS PRESET REFERENCE DATA SIZE

This is a Division of application Ser. No. 09/649,516 filed Aug. 29, 2000 now U.S. Pat. No. 6,932,523. The entire disclosure of the prior applications is hereby incorporated by reference herein in its entirety.

BACKGROUND OF THE INVENTION

1. Field of the Invention

The present invention relates to a printing system including a server and a plurality of clients connected by a network system.

2. Description of the Related Art

There has been known a printing system with one or more client devices connected to a shared printer by a network. The printing system has a spooling function, wherein the client devices transmit print data and print management information data for print jobs to the printer, and the printer stores the print data and associated print management information data in job units in a hard disk.

The print management information data includes data representing time and date that the print data can be deleted, data representing the name of the person who transmitted the print data, data representing the time and date that the print data was transmitted, and data representing the time that the print data was printed out. Based on this print management information data, the printer prints starting with print data that was transmitted first, that is, with the oldest transmission time and date. Also, the printer can delete print data from the hard disk when the deletion time and date arrives or the printer can notify the user that the printing operations have been completed when they are completed.

Sometimes a user of one of client devices wishes to know the condition of print processes that the user of another client device is attempting to execute. The print management information describes the condition of printing processes for each print job. Therefore, the user merely needs to access the printer through the client device in order to confirm the condition of printing processes by referring to the print management information.

However, the condition of printing processes may change directly after the user accesses the printer and confirms the condition of printing processes. That is, printing processes may be executed with respect to certain print data or the print data itself may be deleted. In such cases, any printing processes that the user attempts to execute may be influenced by such changes in the printing process status. Further, in order for the user to accurately grasp the present condition of printing processes, the user must frequently access the printer, which is very troublesome for the user.

In one known printing system, the shared printer maintains the sets of data stored in a hard disk after printing is completed. When the printer receives a reprint command from one of the user device, the printer again prints out based on the print data. This configuration is highly convenient for the user, because the user can print out the same text or images using the same print data, without having to resend the print data.

However, with this type of printing system, the data remains stored in the hard disk unless the user specifically erases it. However, it is troublesome to monitor the contents stored in the hard disk and delete unnecessary print data. Therefore, print data tends to remain in the hard disk of the printer for long periods of time.

Since the region in the hard disk for storing such print data is limited, the capacity of the region can easily be filled up when the user does not diligently delete such print data. If the capacity of the region is exceeded, the it becomes impossible to store any further new print data.

Also, if a number of client devices connected to the network increases, the number of printer data sets sent to the printer and stored in the hard disk of the printer will increase by a proportional amount.

Also, once the computer transmits the print management information data with the print data, there is no way to amend the data even if it includes errors. Accordingly, if print management information data indicates an incorrect deletion time and date, then the printer will erroneously delete the print data at a timing different from when it should be deleted. As a result, the user must retransmits the same print data.

Such printer systems often include a mail server with an electronic mail function. The mall server transmits and receives e-mail messages between the various client devices.

SUMMARY OF THE INVENTION

It is an objective of the present invention to provide a printing system and a printing control method capable of enabling a user to reliably and quickly grasp the situation of printing processes at a printer commonly used by a plurality of client devices through a network by effectively utilizing the e-mail function of the network.

It is a further objective of the present invention to provide a printing system that automatically erases unnecessary print data without the user having to perform any troublesome operations, thereby effectively preventing the memory of the printer from becoming full of unneeded print data.

It is still a further objective of the present invention to provide a printing system capable of amending print management information data transmitted from the computer.

To achieve these objectives, a printing system according to a first aspect of the present invention includes a network, a print controller connected to the network, a mail server connected to the network, and a plurality of client devices connected to the network.

Each of the plurality of client devices includes a print data transmitter that transmits print data sets to the print controller.

The print controller includes a print data receiver, a print data manager, and a notification data preparer. The print data receiver receives the print data sets from the client devices. The print data manager designates correspondence between received print data sets and print management information that indicates conditions of printing operations for each of the received print data sets. The notification data preparer prepares, based on the print management information, notification data to be notified to at least one client device. The notification data preparer transmits the notification data to the mail server.

The mail server Includes an electronic mail preparer that prepares the received notification data into an electronic mail message, and that transmits the electronic mail message to the at least one client device. The at least one client device further includes an electronic mail receiver that receives the notification data in the electronic mail message from the mail server.

A print control method according to the first aspect of the present invention includes the steps of transmitting print data sets from one of the client devices to the print controller; receiving, at the print controller, the print data sets from the client devices; designating, in the print controller, correspondence between the received print data sets and print management information that indicates conditions of printing operations for each of the plurality of received print data sets; preparing, in the print controller, the notification data based on the print management information to be notified to at least one client device; transmitting the notification data from the print controller to the mail server; preparing, at the mail server, received notification data into an electronic mail message to the at least one client device; and receiving, at the at least one client device, the notification data in the electronic mail message from the mail server.

According to a second aspect of the present invention, a printing system includes a reprint number setter, a holder, a reprint controller, and a print data eraser.

The reprint number setter sets, for each print data set, a reprint number representing an upper limit of how many times reprinting operations are to be performed on each print data set. The reprint number setter appends, as appended information, a corresponding reprint number to each of the plurality of print data sets.

The holder holds the plurality of print data sets as targets of reprint processes.

The reprint controller retrieves, from the holder, a print data set for which a reprint command is received. The reprint controller controls reprint processes for the retrieved print data set.

The print data eraser erases, from the holder, each print data set that the reprint controller has used for reprint processes for a number of times equaling the corresponding reprint number.

A program storage medium according to the second aspect of the present invention stores a program of setting, for each print data set, a reprint number representing an upper limit of how many times reprinting operations are performed on each print data set; a program of appending as appended information, a corresponding reprint number to each of the plurality of print data sets; a program of holding the plurality of print data sets as targets of reprint processes; a program of retrieving a held print data set for which a reprint command is received; a program of controlling reprint processes for the retrieved print data set; and a program of erasing each held print data set that has been used for reprint processes for a number of times equaling the corresponding reprint number.

According to a third aspect of the present invention, a print controller includes a reception unit, a storage unit, a print data manager, a judgment unit, and a print data eraser. The reception unit receives a plurality of print data sets for print jobs from a client device.

The storage unit serially stores the print data in a spool region by print job;

The print data manager associates the print data sets stored in the spool region with print management information that includes a predetermined condition.

The judgment unit judges whether or not total data size of print data sets stored in the spool region exceeds a preset reference data size.

When the judgment unit judges that the total data size exceeds the reference data size, the print data eraser selects a print data set according to the predetermined condition of the print management information associated with each print data set, and then erases the selected print data set from the spool region.

A printing system according to the third aspect of the present invention includes a client device and a print controller connected to the client device.

The client device is for handling a plurality of print data sets for print jobs, and includes a print data transmission unit for transmitting the plurality of print data sets to the print controller.

The print controller connected to the client device, and includes a reception unit, a storage unit, a print data manager, a judgment unit, and a print data eraser. The reception unit receives the plurality of print data sets from the client device. The storage unit serially stores the print data In a spool region by print job. The print data manager associates the print data sets stored in the spool region with print management information that includes a predetermined condition. The judgment unit judges whether or not total data size of print data sets stored in the spool region exceeds a preset reference data size. When the judgment unit judges that the total data size exceeds the reference data size, the print data eraser selects a print data set according to the predetermined condition of the print management information associated with each print data set, and erases the selected print data set from the spool region.

A program storage medium according to the third aspect of the present invention stores a program of transmitting, from the client device, the plurality of print data sets to the print controller; a program of receiving, at the print controller, the plurality of print data sets from the client device, a program of serially storing the received print data sets by print job in a spool region of the print controller, a program of associating the print data sets stored in the spool region with print management information that includes a predetermined condition; a program of judging whether or not total data size of print data sets stored in the spool region exceeds a preset reference data size; a program of selecting a print data set according to the predetermined condition of the print management information associated with each print data set when the judgment unit judges that the total data size exceeds the reference data size; and a program of erasing the selected print data set from the spool region.

According to a fourth aspect of the present invention includes a network, a print controller connected to the network, and a printer connected to the network.

The print controller includes a print-controller-side transceiver and a print-controller-side controller. The print-controller-side transceiver transmits commands and data to and receives commands and data from the printer over the network. The print-controller-side controller controls the print-controller-side, transceiver to selectively transmit to the printer a storage command commanding the printer to store data, a retrieval command commanding the printer to retrieve and transmit stored data, and an update command commanding the printer to update stored data.

The printer includes a printer-side transceiver, a storage unit, and a printer-side controller. The printer-side transceiver transmits commands and data to and receives commands and data from the print controller over the network. The storage unit that stores data. The printer-side controller, upon receipt of a storage command, stores data in the storage unit, and, upon receipt of a retrieval command, controls the storage unit to retrieve data indicated by the retrieval command and controls the printer-side transceiver to transmit the retrieved data to the print controller.

The print controller further includes an amender that amends data retrieved by and transmitted from the printer as a result of the retrieval command. The print-controller-side transceiver transmits the amended data to the printer. The printer-side controller, upon receipt of an update command, updates data stored in the storage unit based on the amended data from the print controller.

A method according to the fourth aspect of the present invention includes the steps of transmitting a storage command from the print controller to the printer; storing data in a storage unit of the printer, upon receipt of a storage command at the printer; transmitting a retrieval command from the print controller to the printer; retrieving the data from the storage unit of the printer, upon receipt of the retrieval command at the printer; transmitting the retrieved data from the printer to the print controller; amending the data transmitted from the printer as a result of the retrieval command; transmitting the amended data from the print controller to the printer; transmitting an update command from the print controller to the printer; and updating, upon receipt of an update command, the data in the storage unit of the printer, based on the amended data from the print controller.

A program storage medium according to the fourth aspect of the present invention that is capable of being read by a print controller stores a program of transmitting a storage command to the printer, commanding the printer to store data in a storage unit of the printer; a program of transmitting a retrieval command to the printer, commanding the printer to retrieve the data from the storage unit and transmit the data to the print controller; a program of amending data transmitted from the printer as a result of the retrieval command, a program of transmitting the amended data to the printer; and a program of transmitting an update command from the print controller to the printer, commanding the printer to, upon receipt of the update command, update the data in the storage unit of the printer, based on the amended data from the print controller.

A program storage medium according to the fourth aspect of the present invention that is capable of being read by a printer stores a program of receiving a storage command from the print controller, and storing data in a storage unit accordingly; a program of receiving a retrieval command from the print controller, retrieving the data from the storage unit accordingly, and transmitting the data to the print controller; a program of receiving amended data from the print controller; and a program of receiving an update command from the print controller, and accordingly updating the data in the storage unit, based on the amended data from the print controller.

BRIEF DESCRIPTION OF THE DRAWINGS

The above and other objectives, features, and advantages of the invention will become more apparent from reading the following description of the embodiments taken in connection with the accompanying drawings in which:

FIG. 14 is a schematic view representing print management Information stored in a memory of a network printer of the printing system in FIG. 13;

FIG. 21 is a schematic view showing a screen for editing print management information, displayed by a client device of the printing system in FIG. 18.

DETAILED DESCRIPTION OF THE EMBODIMENTS

Figure 1:
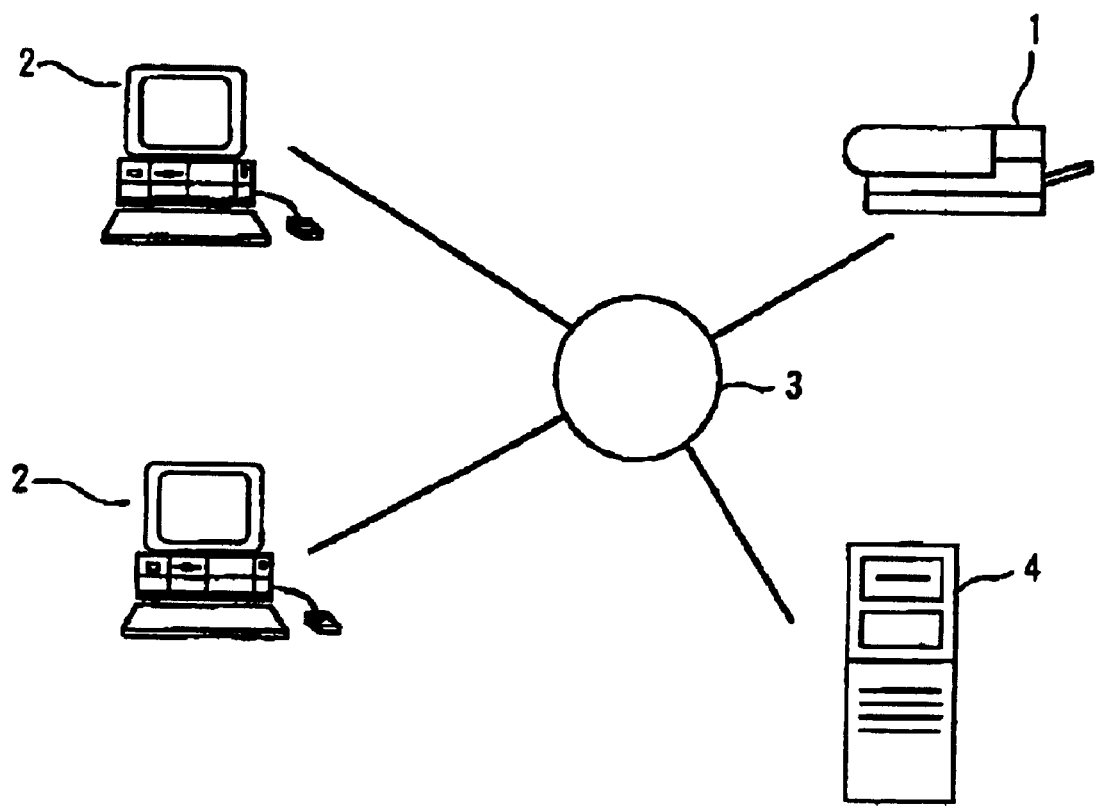
FIG. 1 is schematic view showing a printing system according to a first embodiment of the present invention.

Next, a printing system according to a first embodiment of the present invention will be described while referring to FIGS. 1 to 7. FIG. 1 is a schematic view showing the printer system according to the first embodiment. As shown in FIG. 1, the printer system according to the first embodiment includes a network printer 1, a mail server 4, and a plurality of client devices 2 all connected by a network 4. The printer serves as a printing device for the entire system. The mail server distributes electronic mail messages across the network. The client devices can be personal computers, for example. It should be noted that although FIG. 1 shows only two client devices 2, the printing system can include any number of client devices 2 or only one client device 2. The network 4 according to the present embodiment uses, for example, TCP/IP (Transmission Control Protocol/Internet Protocol) as its transmission protocol.

Here, a summary will be provided for interaction between units of the printer system shown in FIG. 1. A client device 2 is used to prepare print data. When a print request is inputted, the client device 2 appends print management information to the print data, and transmits the print data to the network printer 1 across the network 4. The network printer 1 receives the print data and selects predetermined data from the print management information appended to the print data. The network printer 1 transmits the selected predetermined data to the mail server 4 as notification data.

The mail server 4 then converts the notification data into the format of an e-mail message, and designates which of the client devices 2 are to be the recipient of the e-mail message. In order to obtain the notification data, the client devices 2 access the mail server 4 to receive any electronic messages that are addressed to them.

Figure 2:
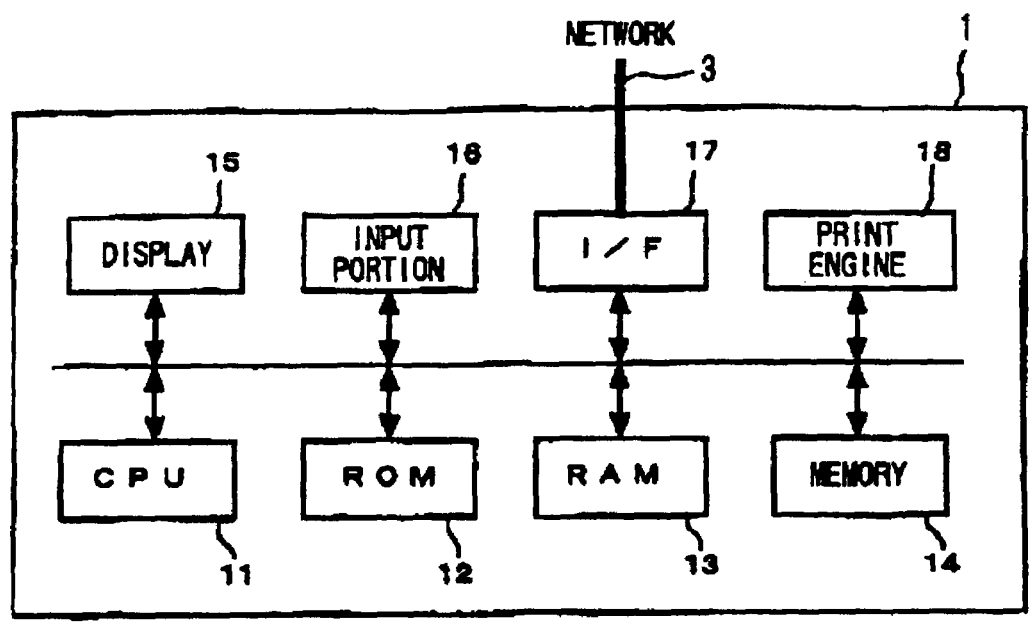
FIG. 2 is a block diagram showing functional component of a network printer of the printing system in FIG. 1.
Figure 3:
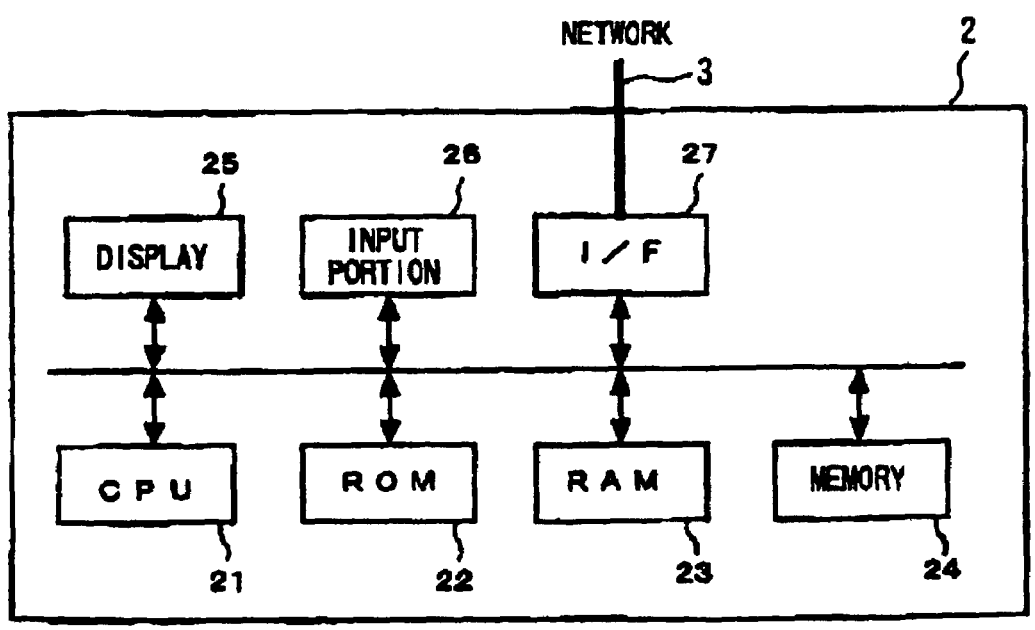
FIG. 3 is a block diagram showing functional components of a client device of the printing system of FIG. 1.

Next, the hardware configuration of the printing system of the present embodiment will be explained while referring to FIGS. 2 and 3. FIG. 2 is a block diagram showing hardware configuration of the network printer 1. FIG. 3 is a block diagram showing hardware configuration of one of the client devices 2. It should be noted that both the mail server 4 and the client devices 2 are all configured from personal computers and so have the same basic hardware configuration. Therefore, the mail server 4 has the same basic hardware configuration as shown in FIG. 3 for the client devices 2, so explanation for the mail server 4 will be omitted.

As shown in FIG. 2, the network printer 1 includes a CPU 11, a ROM 12, a RAM 13, a memory 14, a display 15, an input portion 16, an interface 17, and a printer engine 18. The interface 17 of the network computer 1 is connected to the network 4. The CPU 11 performs overall control of the network printer 1 and also executes control programs. The ROM 12 stores a print control program and other necessary parameters as fixed data. The RAM 13 temporarily stores data and programs required for a variety of different processes. The RAM 13 temporarily stores print data transmitted from the client device 2 as needed for data development processes and print processes.

The memory 14 is a rewritable memory, such as a hard disk, for storing a variety of large sized data sets. For example, the memory 14 stores print data, which is the subject of printing processes. The client device, 2 transmit print data sets for different print jobs. The print data sets are serially spooled into the memory 14 one print job at a time. When one of the print Jobs is actually to be performed, then the corresponding print data set is retrieved from the memory 14. The memory 14 also stores each print data set in association with corresponding print management information. The print management information includes a variety of data indicating conditions of print processes. For example, print, management information can include a print data set ID for each print data set, the person who prepared the print data, when the print data was spooled into the memory 14, when printing was last performed based on the print data, whether the print data should be erased, and, if so, then when the print data set can be erased. The network printer 1 manages print jobs based on this print management information. It should be noted that the print management information associated with the print data can be appended to the print data and spooled as in the present embodiment, or stored in a predetermined region of the memory 14 separate from where the print data is stored.

The display 15 is a liquid crystal panel, for example, for displaying data relating to printing processes. The input portion 16 can be a set of keys pressed by the user to input commands, and data, for example, into the network printer 1.

The interface 17 performs interface operations, such as converting protocols when a variety of data is transmitted and received between the mail server 4 and the client device 2 across the network 4.

The print engine 18 prints out based on the print data for which a print command has been received from the CPU 11. The print engine 18 could be an ink jet type or laser beam type print engine, for example.

As shown in FIG. 3, the client device 2 includes a CPU 21, a ROM 22, a RAM 23, a memory 24, a display 24, an input portion 26, and an interface 27. It should be noted that the interface 27 of the client devices 2 is connected to the network 4.

The CPU 21 performs overall control of each of the client devices 2 and also executes a variety of different application software. The CPU 21 prepares a variety of different print data by executing application software.

The ROM 22 stores a variety of programs and required parameters as fixed data. The RAM 23 temporarily stores, for example, work data for a variety of programs. The memory 24 is a rewritable memory, such as a hard disk. A variety of application software are installed into the memory 24.

The display 25 is a liquid crystal display or a CRT, which displays based on image data. The input portion 26 is a key board, for example, through which the user inputs data required for processes at the client device 2.

The interface 27 performs interface operations, such as converting protocol when a variety of different data types are transmitted between the client devices 2 and the network printer across the network 4.

The hardware configuration for the mail server 4 is substantially the same as the hardware configuration shown for the client device 2 in FIG. 3. However, the CPU 11 of the mail server 4 executes special e-mail control software. It should be noted there is no need to provide a display 15 of the input portion 16 when the mail server 4 automatically executes processes.

Figure 4:
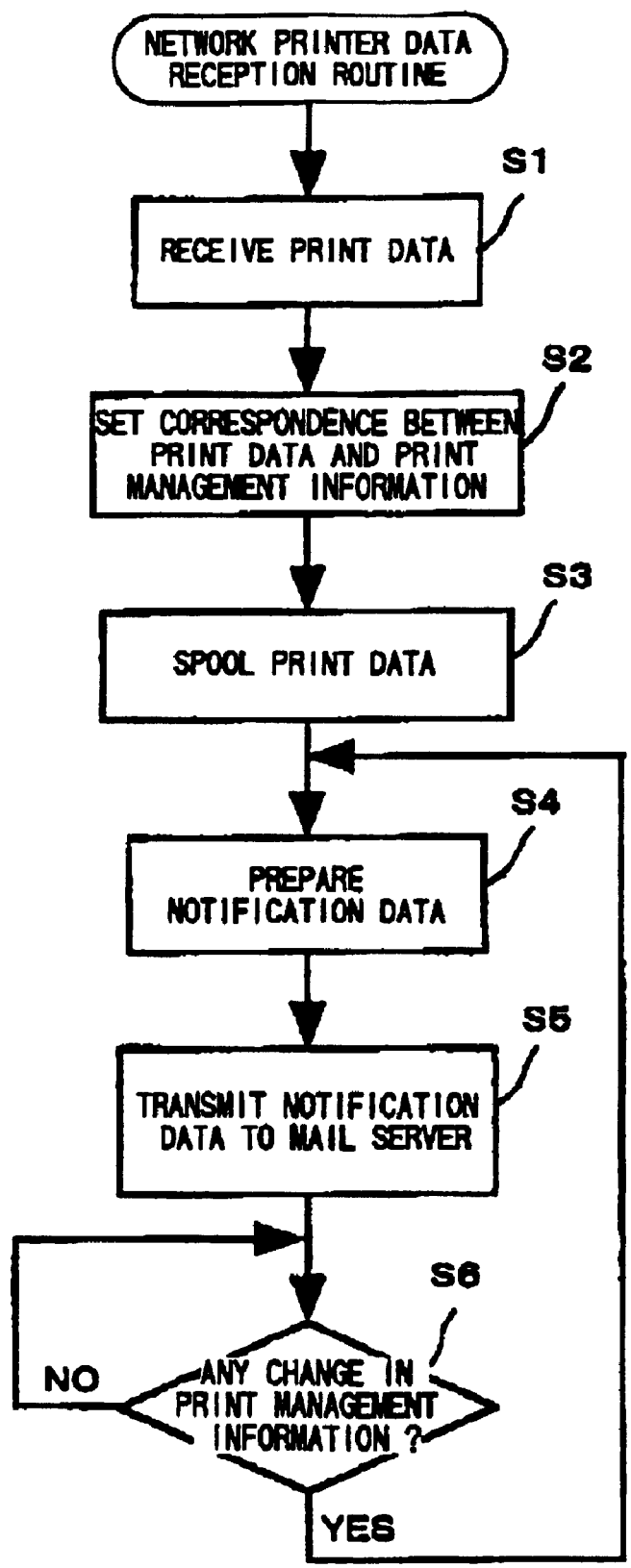
FIG. 4 is a flowchart showing a data reception routine performed by the network printer of FIG. 2.
Figure 5:
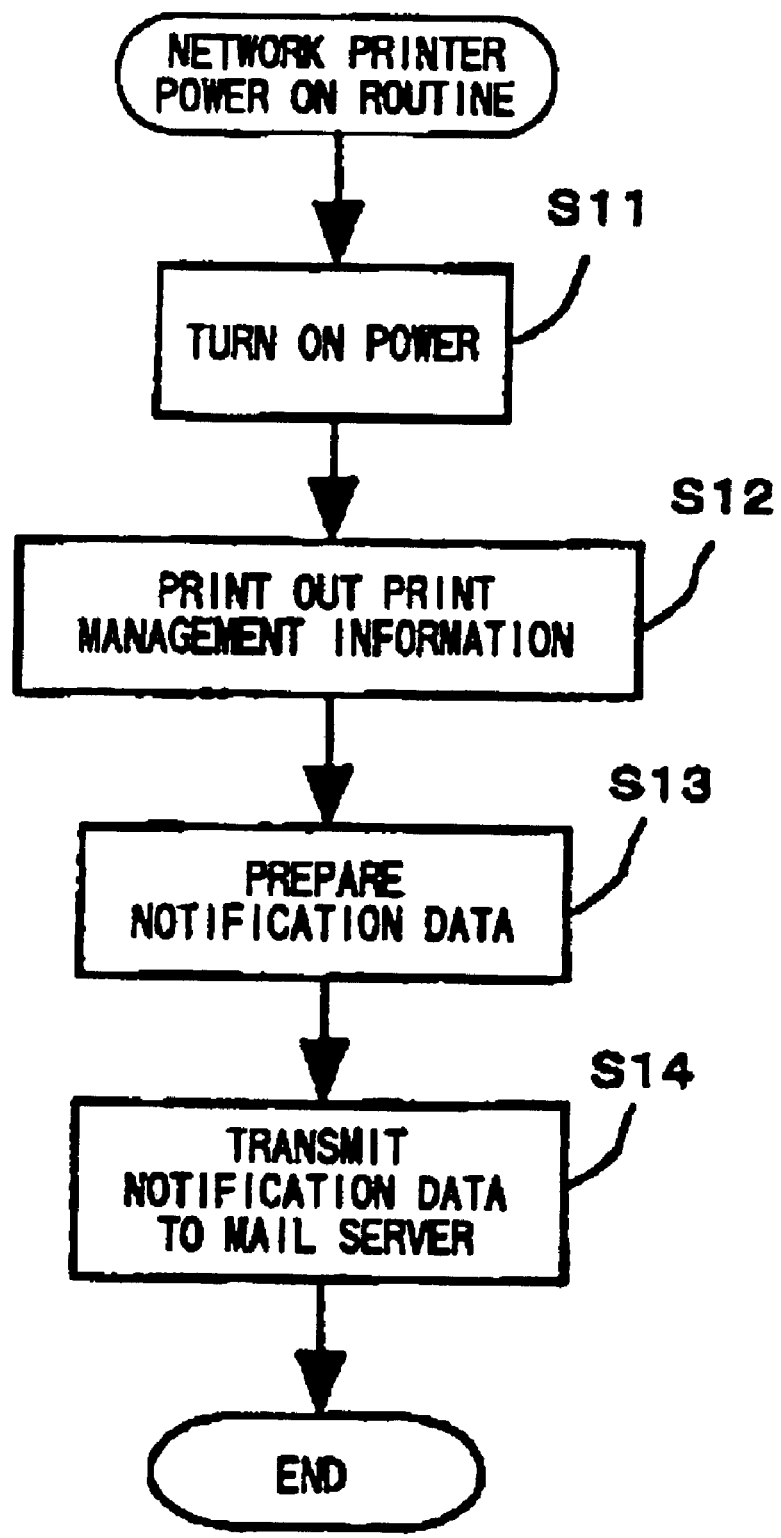
FIG. 5 is a flowchart showing a power on routine performed by the network printer of FIG. 2.
Figure 6:
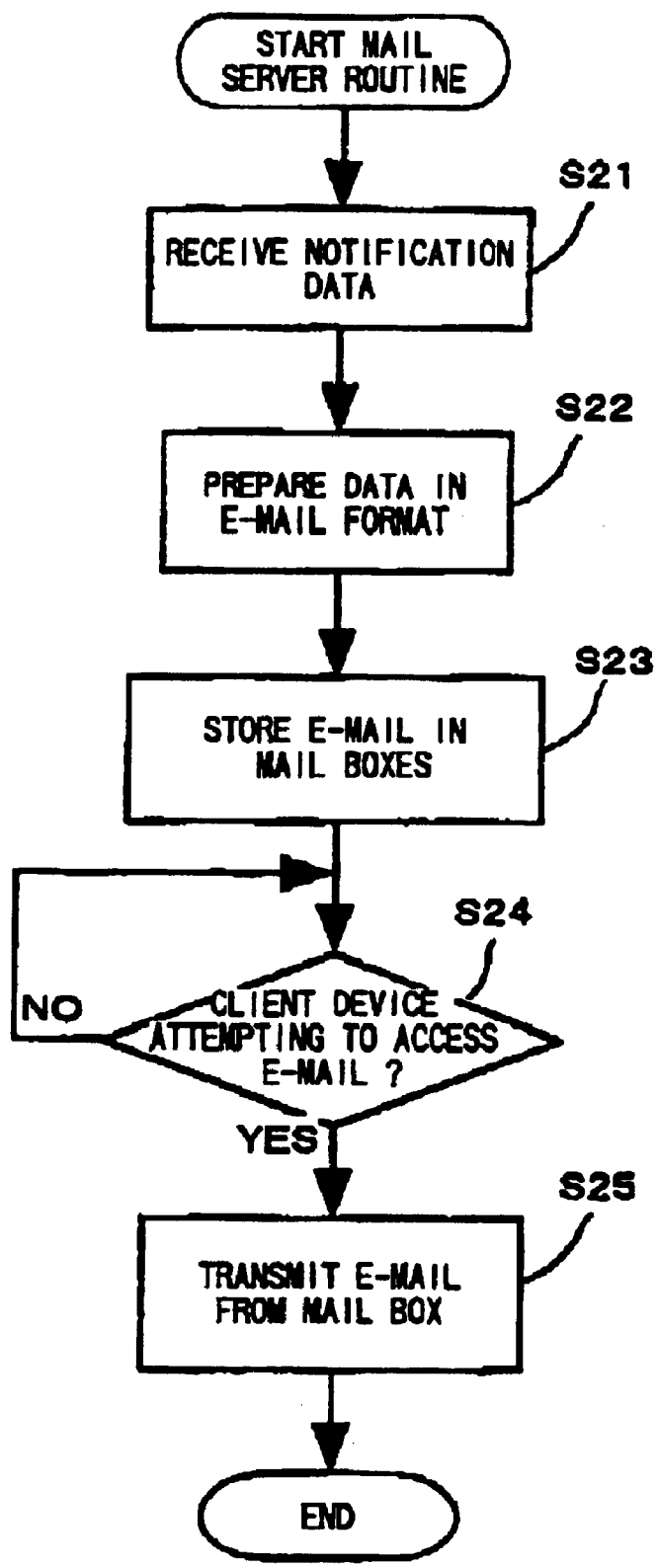
FIG. 6 is a flowchart showing a mail server routine performed by a mail server of the printing system of FIG. 1.
Figure 7:
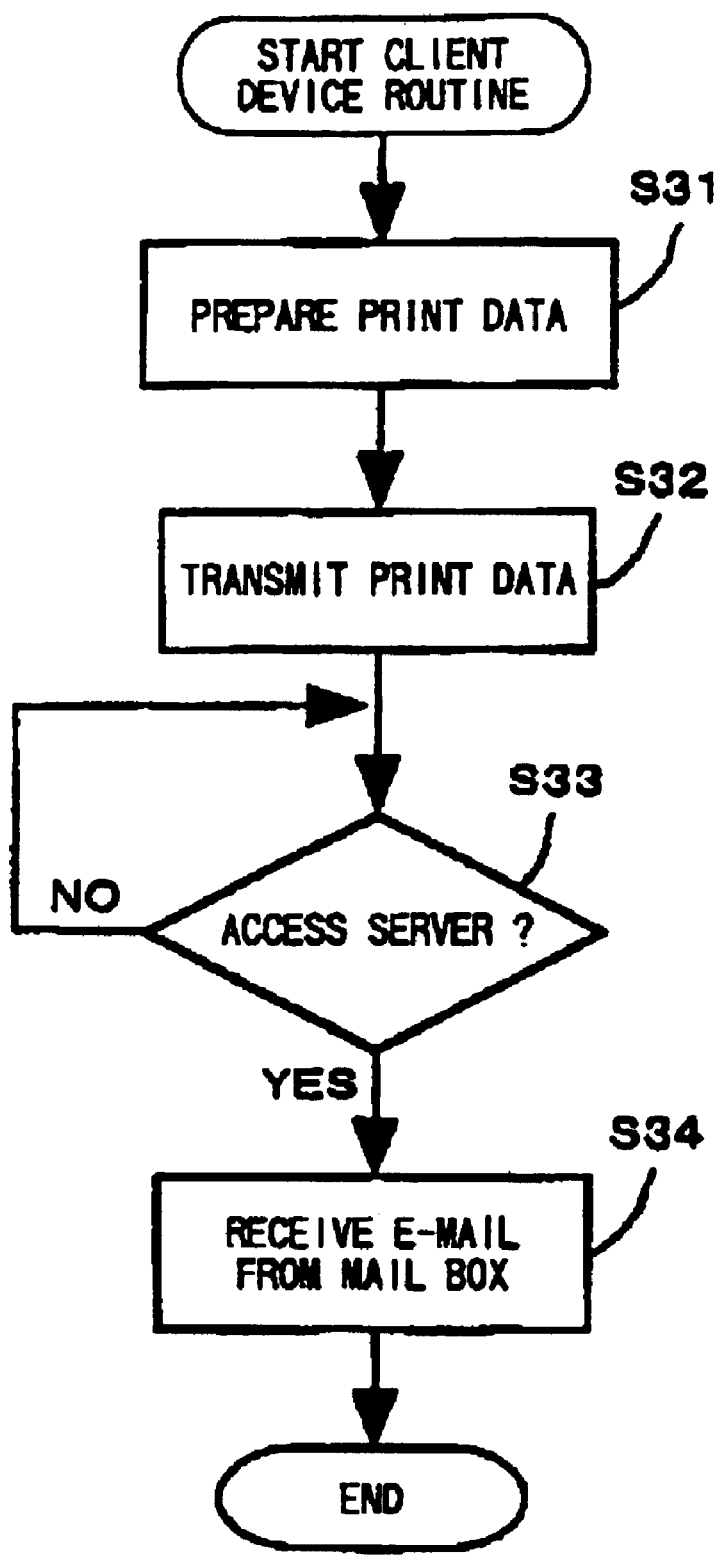
FIG. 7 is a flowchart showing a client device routine performed by the client device of FIG. 3.
Figure 8:
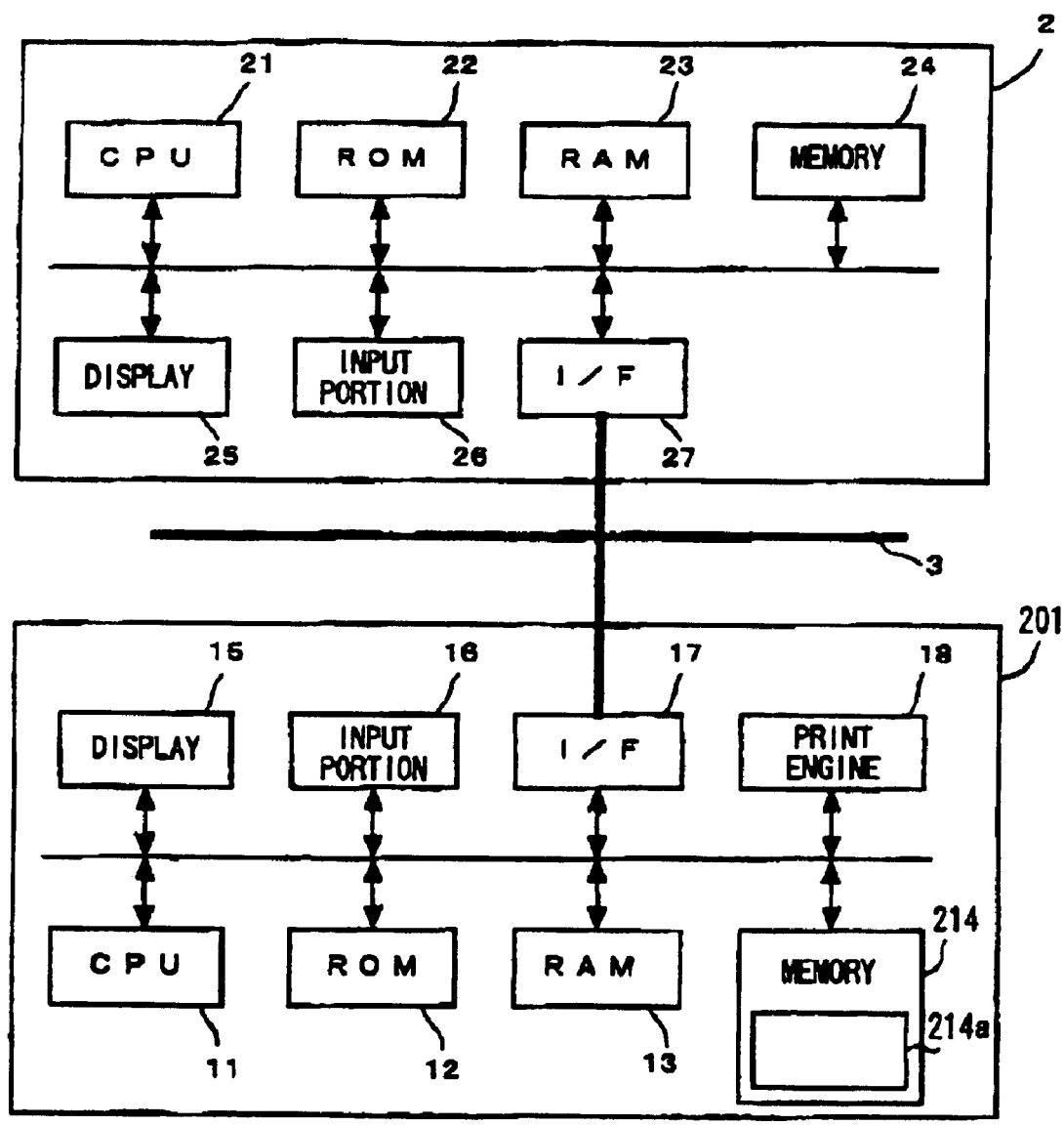
FIG. 8 is a block diagram showing a printing system according to a second embodiment of the present invention.

Next, processes executed by the printer system will be described while referring to FIGS. 4 to 7. The network printer 1 according to the present embodiment prepares notification data based on print management information stored in association with each print data set. The notification data is transmitted to the each client device 2 through the mail server 4 as an e-mail message, so that the user of the each client device 2 can quickly grasp the present condition of each print job. FIGS. 4 and 5 are flowcharts representing processes executed in the network printer 1. FIG. 6 is a flowchart indicating processes executed by the mail server 4. FIG. 7 is a flowchart representing processes executed by each client device 2.

First, processes executed by the network printer 1 will be explained while referring to the flowchart of FIG. 4. First, in S1 the network printer 1 receives print data transmitted from one of the client devices 2 over the network 4. Then, in S2, correspondence is set between the received print data and print management information required for managing the print data as a print job.

In S3, print data sets received for each print job are serially spooled by print job into a predetermined region of the memory 14. The print data is spooled into the memory 14 in S3 after being subjected to developing processes and the like for putting the print data into a data format appropriate for the printer engine 18. The printer engine 18 will not actually print based on the print data until it receives a print command from the corresponding client device 2.

In S4, notification data for notifying the client devices 2 is prepared based on the print management information associated with the print data. The notification data is extracted from the print management information stored for print data in the memory 14, either from a previously designated category or from a appropriately selected category of the print management information. The notification data can be prepared based on print management information in association with all print data spooled into the memory 14 or based on print data associated with the subject print data.

Further, the notification data prepared in S4 can include a single type of data, or the client devices 2 can be divided into groups and different types of notification data can be prepared for each different group of the client devices 2. With this configuration, the printing system is very flexible and can easily handle situation wherein a plurality of different client devices attempt to obtain different data on the printing conditions.

For example the client devices 2 can be divided into a normal user group and a management group, and different notification data can be prepared to these two different groups. In this case, the notification data for general users can include relatively simple print management information on general printing conditions of the printer. The notification data for management can include the same notification data as for general users and also further detailed data necessary for managing the printing system. With this configuration, the system can notify information to users as is suitable to the situation of the users so that the system management is easy. Also, convenience to the users is increased.

Next in S5, the notification data is transmitted to the mail server 4 over the network 4. The notification data can be transmitted in any data format that can be handled by both the network printer and the mail server 4.

In S6, the printer judges whether or not the print management information stored in the memory 14 has changed or not. For example, the printer judges whether or not the spooled print data was erased from the memory, 14, or whether or not the time and the date of last printing has changed. The time and date of the last printing can change because a reprint command was received and reprinting operations were executed for the spooled print data. If the printer Judges that the print management information has changed (S6:YES), then the printer amends the print management information stored in the memory 14 and advises the client devices 2 accordingly.

If the print management data has not been changed (S6:NO), then the printer waits for changes in the print management information while performing other processes. If the print management data was changed (S6:YES), then the routine returns to S4, prepares new notification data in S4, and transmits the new notification data to the mail server 4 in S5. Then, the routine repeats processes in the manner described above.

The flowchart in FIG. 5 represent processes performed by the network printer 1 when the power is turned ON. First, in S11, the power source of the network printer 1 is turned ON to start up the printer system. For example, when a hard disk is used as the memory 14, the memory 14 will maintain the same information from when the network printer 1 was last turned OFF. Therefore, spooled print data and print management information will remain in the memory 14 from when the power source of the network printer 1 was last turned OFF.

Next, in S12, the print management information in the memory 14 is printed out. This enables the user who turned ON the power source of the network printer 1 to visually grasp the contents of the memory 14. When past print data is maintained in the printing system from when the power source was last turned ON, the user can be made aware of this condition so that the user can grasp the printing condition on the network over a broad period of time.

It should be noted that when the user does not require the print management information to be printed, then S12 can be omitted. Alternatively, the network printer 1 can be designed so that the processes of S12 can be optionally turned ON and OFF. In other words, in this case the processes in S12 can be selectively executed or not executed depending on whether the user indicates that the print management information of the memory 14 should be printed out or not.

Next, in S3, notification data to be notified to the client devices 2 is prepared based on the print management information stored In the memory 14. In S14, the prepared notification data is transmitted to the mail server 4 across the network 4. The processes performed in S13 and S14 are the same as described above for S4 and S5.

After S14 is completed, the routine proceeds to the processes of S1 to S6 shown in the flowchart of FIG. 4. When the power source of the network printer 1 is turned OFF, and again turned ON, then the processes of S11 to S14 are performed.

Next processes performed by the mail server 4 will be explained with reference to the flowchart of FIG. 6. The mail server 4 will be explained as though it were provided specifically to the printer system of the present embodiment for distributing only electronic mail messages for notification data and not for distribution of regular e-mail messages.

In S21, the wail server 4 receives notification data from the network printer 1 across the network 4. Next, in S22, the mail server 4 prepares e-mail data including the received notification data as the body of the e-mail message. That is, in S22, the mail server 4 prepares an e-mail message for each pertinent client device 2. Each e-mail message includes text data that corresponds to the notification data and the mail address of the corresponding client device 2. The mail addresses of the client devices 2 can be determined using a data table either preset in the mail server 4 or received from the network printer 1 with the notification data.

In S23, the e-mail prepared in S22 is stored in the mail box of each pertinent client device 2. These mail boxes are provided to a predetermined region of the memory 14. For example, a special directory could be provided for each client device 2. The corresponding e-mail can be stored as files in the special directory of each client device 2.

In S24, the mail server 4 monitors whether or not any of the client devices 2 have attempted to access to its mail box in the memory 14 of the mail server 4. If not (S24:NO), then the mail server 4 continues to wait until one of the client devices 2 attempts to access its mail box. Once a client device 2 attempts to access the mail server 4 (S24:YES), then in S25, the mail server 4 retrieves the e-mail from the mail box for the corresponding client device 2. It should be noted that post office protocol (POT) can be used as the transmission protocol for e-mail sent from the mail server 4 to the client device 2.

It should be noted the client devices 2 can be divided into a plurality of different groups. In this case, e-mail data is prepared separately for each corresponding group and stored in appropriate mail boxes for the groups.

Next, processes performed in the client devices 2 will be described while referring to FIG. 7. This explanation will be provided for when a client device 2 transmits print data to the network printer 1, and as a result receives notification in an e-mail message from the mail server 4.

First in S31, the client device 2 starts up an application software for preparing print data. It should be noted that previously prepared print data can be used instead of preparing print data in S31.

In S32, the print data is transmitted to the network printer 1 across the network 4. As a result of S32 in the client device 2, the network printer 1 will perform the operations described in S1 to S5 to prepare notification data in association with the spooling operation for the print data and to transmit the notification data to the mail server 3. In addition, the mail server 4 will perform the operations described in S21 to S23 to prepare an e-mail message based on the notification data.

Next, in S33, the client device 2 judges whether a command has been received to access to the mail server 4. The processes of S33 performed by the client device 2 correspond to the processes of S24 performed by the mail server 4. The processes in S33 for accessing to the mail server 4 across the network 4 can be performed at a timing designated by the user, or automatically by the client device 2.

When the client device 2 judges that the mail server 4 need not be accessed (S33:NO), then the client device 2 waits for a need to access to the mail server 4 while performing other processes. Once the mail server 4 is to be accessed (S33:YES), then in S34 the client device 2 accesses the corresponding mail box in the mail server 4 and receives any e-mail messages in the mail box. The user of the client device 2 refers to the received e-mail message to easily grasp the contents of the notification data. It should be noted that when the client devices 2 are divided into a plurality of groups, then the received e-mail messages correspond to the e-mail message for the group to which each client device 2 belongs.

According to the present embodiment, the network printer 1 is shared by a plurality of client devices 2 connected to the same network 4. Whenever the printing conditions at the network printer 1 change, the network printer 1 prepares notification data based on print management information. This notification data is distributed to all the client devices 2 as e-mail from the mail server 4. The above-described processes can be executed at a convenient timing, such as when a new print data set is spooled into the memory, when the print management information is changed, or when the power source of the network printer 1 is turned ON. With this configuration, each user can quickly grasp the present printing conditions by referring to the e-mail messages without performing operations to access the network printer 1. Also, notification data is transmitted as e-mail by the mail server 4, so that only a simple configuration is required to enable the user to quickly grasp the printing conditions.

As described above, the client devices 2 can be divided into a number of groups, and different notification data can be transmitted to the client devices 2 separately for the different groups. With this configuration, the printing conditions required specifically by each user can selectively advised to the users individually. For example the client devices 2 can be divided into a user group and a management group. Data for general print conditions can be sent to the user group and management for managing the printer system can be sent to the management group. In this way, processes can be performed in accordance with the needs of the system.

According to the present embodiment, the network printer 1 prepares notification data and transmits the notification data to the mail server 4 when new printing data is received, when print management information changes, or when the power source of the network printer 1 is turned ON. However, the network printer 1 can prepare and transmit notification data at any convenient timing.

As described above, notification data is prepared based on print management information that corresponds to received print data. The notification data is then transmitted to the mail server 4. The mail server 4 sets the notification data into an e-mail message. The client devices 2 receives the e-mail messages to obtain the notification data. With this configuration, the user can quickly and easily grasp the present printing conditions without accessing the network printer 1. Moreover, an e-mail function already provided in the printing system can be effectively utilized. Accordingly, a printer system with a simple configuration can increase the convenience to users.

Next, a printing system according to a second embodiment of the present invention will be described while referring to FIGS. 8 to 12. The printing system of the second embodiment has substantially the same configuration as the printing system of the first embodiment, so the following explanation will be provided for only dissimilar components and operations. For example, the printer 1 of the first embodiment is replaced with a printer 201 having substantially the same configuration as that of the printer 1 of the first embodiment, except that the memory 14 is replaced with a memory 214. Also, the second embodiment will be explained assuming only a single client device 2 is connected to the network, although a plurality of client devices 2 can be connected to the network in the same manner as the first embodiment.

The memory 214 stores print data transmitted from the client device 2 as the target of reprint processes. In the second embodiment, the memory 214 includes a print data storage region 214*a* for serially storing a plurality of print data sets by print job. The print data stored in the print data storage region 214*a* is deleted in the manner to be described later.

Figure 9:
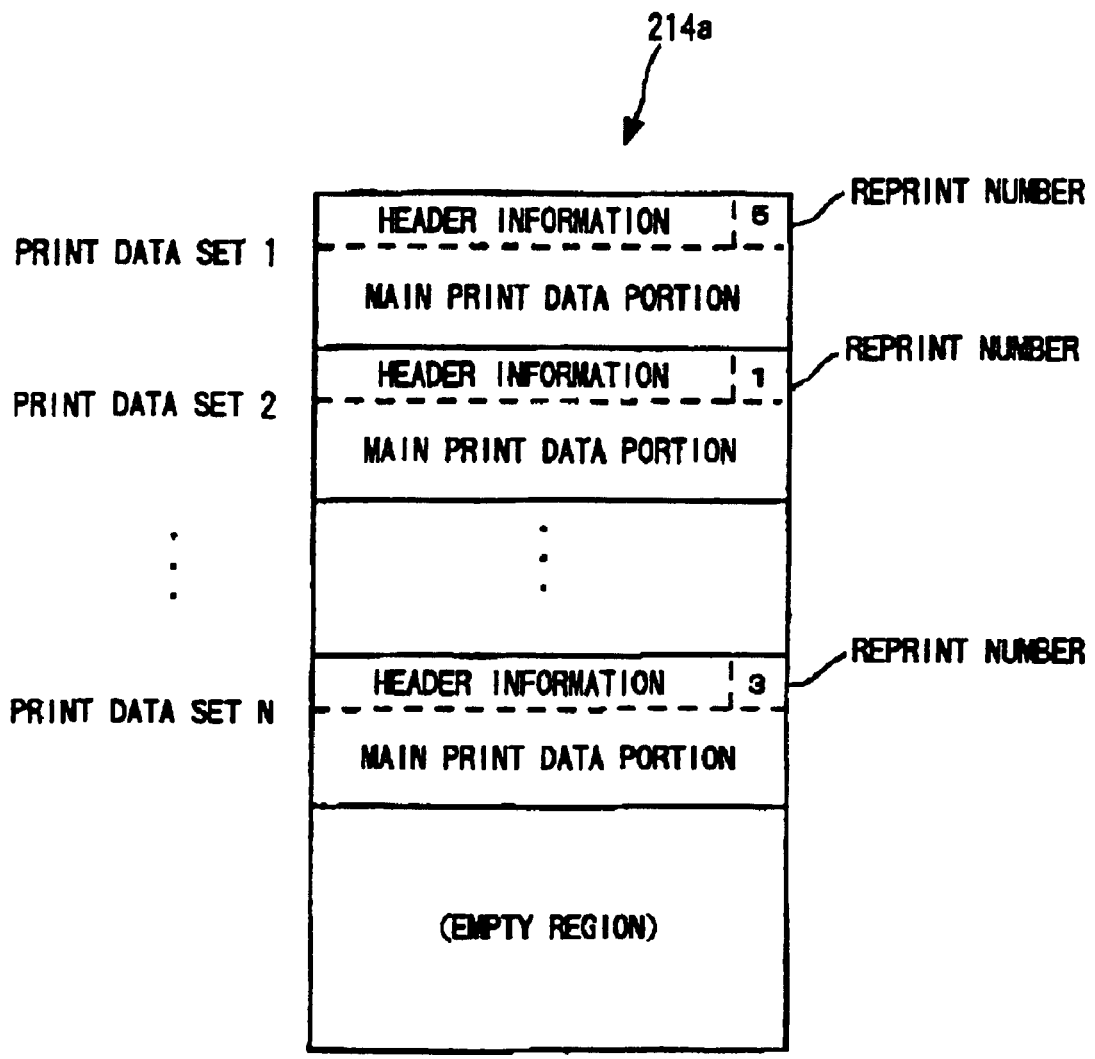
FIG. 9 is a schematic view showing a print data storage region in a network printer of the printing system of FIG. 8.

Next configuration of print data stored in the print data storage region 214*a* will be described while referring to FIG. 9. As shown in FIG. 9, the print data storage region 214*a* stores N sets of print data 1, 2, . . . , N which are stored in the order transmitted from the client device 2. The region subsequent to the region where the last print data set N is stored is an empty region.

As shown in FIG. 9, each print data set includes header information and a main print data portion. The header information is appended to each set of print data, and includes a variety of control information, The main print data portion is the data that is actually outputted to the printer engine 18. According to the present embodiment, the client device 2 prepares print data in a variety of different data formats. In order to produce print data in a data format that the print engine 18 can actually process, the print data from the client device 2 is subjected to conversion processes, such as bitmap development. This converted print data is then stored in the print data storage region 214*a* as the main print data portion. However, the print data from the client device 2 can be stored in the print data storage region 214*a* before being subjected to the conversion processes. In this case, the conversion processes for converting the print data into a format that the printer engine 18 can process can be performed once printing is actually to be performed.

Each set of header information includes a reprint number. Each reprint number indicates an upper limit to the number of times reprinting operations can be performed with respect to a particular print data set. The reprint number is used in processes to be described later. In the example of FIG. 9, the print data set 1 includes a reprint number of 5, the print data set 2 includes a reprint number of 1, and the print data set N includes a reprint number of 3 written at, for example, the end of the header information set. As will be described later, the reprint number for each set of print data is set by the client device 2 and transmitted to the network computer 1 with the print data. Therefore, the reprint number can be extracted from the data stream and appended to the header information.

As will be described in more detail later, the reprint number set for each set of print data can be changed by key operations at the input portion 16. When no particular reprint number is designated in the header information of a print data set, a predetermined default value can be used as the reprint number. The default value can be set to a different value depending on the type of print data or the user of the client device 2, for example.

The interface 17 of the network printer 201 performs interface operations when a variety of data is transmitted between the client device 2 and the network printer 201 over the network 3 and is capable of transmitting data to the client device 2 and receiving data from the client device 2.

Next, print processes performed by the printer system for print data will be described while referring to the flowcharts in FIGS. 10 to 12. According to the second embodiment, the network printer 201 can perform reprint processes for each print data set stored in the print data storage region 214a. This enables printing out characters, figures, and the like based on the same print data several times without having to resend the print data from the client device 2 to the network printer 201. Further, deletion processes are preformed on the print data so that empty regions will always be available in the limited capacity of the memory 214, even when print data is successively stored in the memory 214 from a number of different client devices 2. Of the various processes performed by the client devices 2 and the network printer 201, the following explanation will be mainly for reprint processes and deletion processes.

Figure 10:
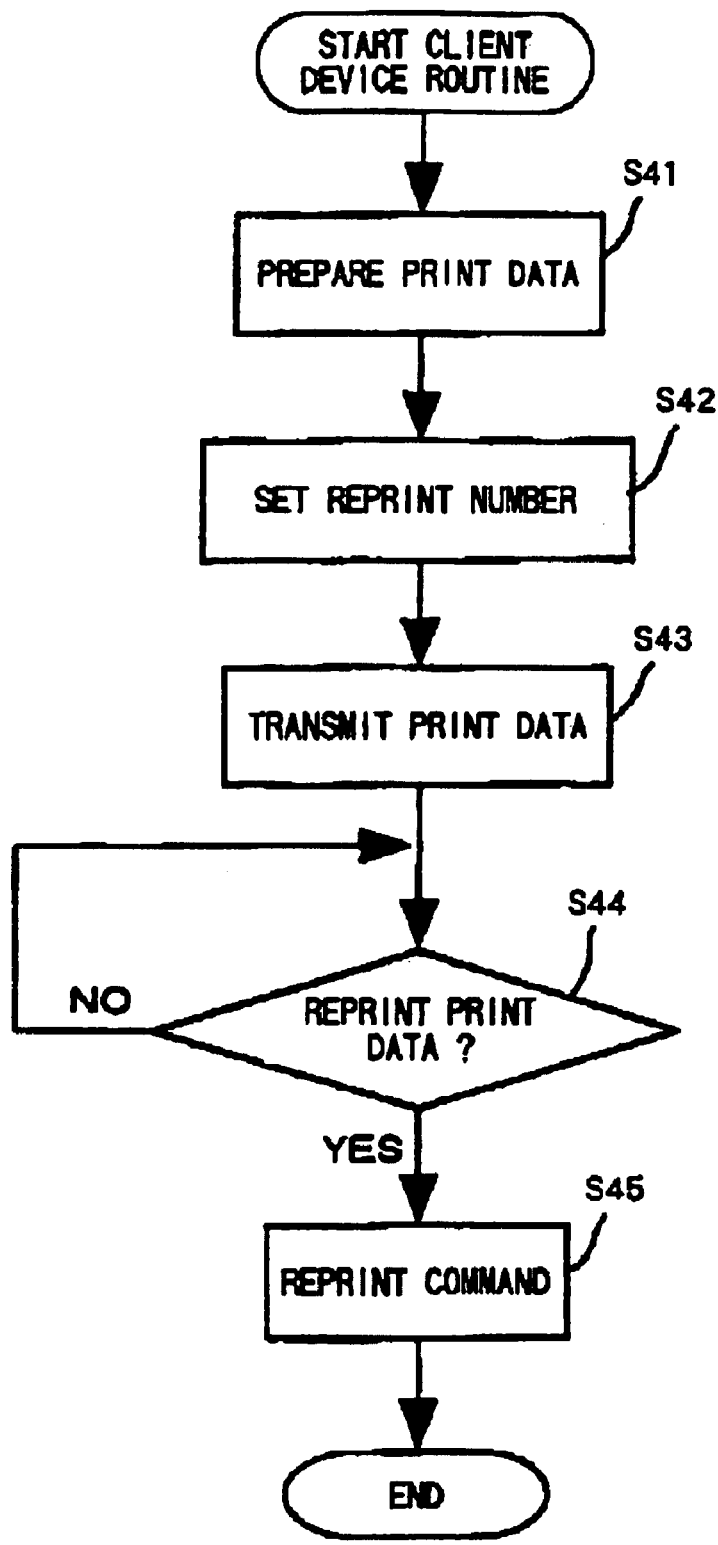
FIG. 10 is a flowchart showing a client device routine performed by a client device of the printing system of FIG. 8.
Figure 11:
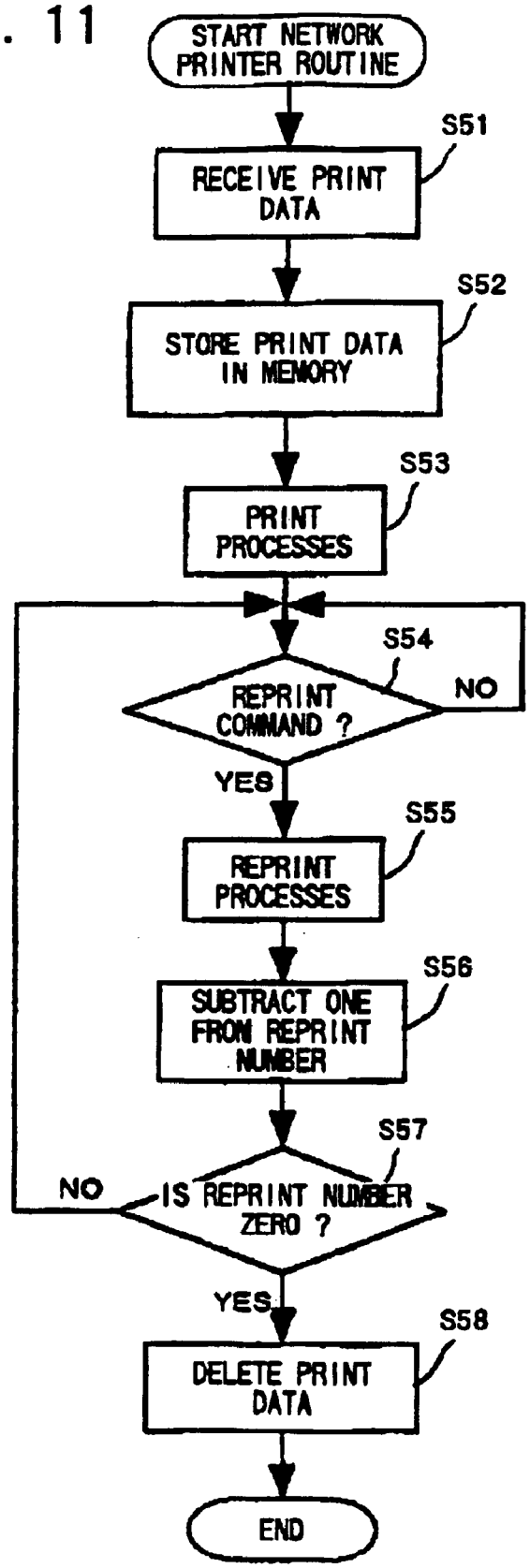
FIG. 11 is a flowchart showing a network printer routine performed by the network printer of the printing system of FIG. 8.

FIG. 10 is a flowchart representing processes performed by the client device 2 of the second embodiment. First, in S41, the application software is started up in the client device 2 and print data is prepared according to the format of that particular client device 2. It should be noted that in S41, data that has already been prepared can be used as print data in this step.

Next in S42, a reprint number described above is designated for the print data prepared in S41. This reprint number presents an upper limit to the number of times that the reprint operations can be executed after the user of the client device 2 first prints based on the print data. The reprint number can be set using a variety of different conceivable methods, such as providing a setting function in the printer driver or providing configuration for enabling the user to input the reprint number as an optional command.

Next, in S43, the client device 2 transmits the print data to the network printer 201 across the network 3. At this time, the client device 2 transmits the reprint number that was set for the print data, and also a print command, with the print data. If the objective of transmitting the print data is merely to store the print data in the memory 214, then no print command is transmitted with the print data.

Afterwards, in S44, the client device judges whether or not reprint processes are to be performed for the print data. That is, the client device 2 waits for the user to command that the print data be reprinted, for example, by waiting for predetermined input operations from the user at an appropriate timing.

If in S44, no reprint command is discovered (S44:NO), then the client device 2 waits until a reprint command is detected (S44:YES), whereupon the client device 2 transmits a reprint command to the network printer 201 in S45. It should be noted that the processes in S44 and S45 are actually repeatedly executed. However, any print data set that has been reprinted in the same number of times as the reprint number is deleted in a manner to be described later. Therefore, the client device 2 must either count the number of times that reprinting is performed in S45, or confirm the present storage condition of print data in the network printer 201.

Next, processes performed in the network printer 201 will be described while referring to the flowchart in FIG. 11. First in S51, the network printer 201 receives print data transmitted across the network 3 from the client device 2 in S43 of FIG. 10. At this time, the received print data is temporary stored in the RAM 13. It should be noted that the reprint number is received with the print data and so must be extracted from the print data.

Next, in S52, the received print data is serially stored in the print data storage region 214a of the memory 214. As shown in FIG. 9, the print data is stored in the print data storage region 214a as header information, a main print data portion, and a reprint number. As described above, the header information includes control information, the main print data portion has been subjected to appropriate processes, such as bitmap development, and the reprint number was extracted from the print data.

Next, in S53, printing processes are performed using the print data based on a print command from the client device 2. That is, the print data, which has been converted into a predetermined text format as described above, is outputted to the printer engine 18, which prints out accordingly. It should be noted that print data for which no print data has been received is not processed in S53.

It should be noted that the processes in S52 and S53 can have the order reversed. In this case, the print data stored in the RAM 13 can first be subjected to the print processes and then, afterwards, be stored in the memory 214.

In S54, it is Judged whether or not a reprint command has been received from the client device 2 for the print data. This reprint command indicates that a reprint process to be described later is to be executed in accordance with the reprint command from the client device 2 in S45. If no reprint command is received (S54:NO), then the network printer 201 performs other processes while waiting for a reprint command. When a reprint command is received (S54:YES), then print data is retrieved from the print data storage region 214a and the reprint process described above is performed. Actually the reprint process involves the same print process described in S53.

Next, in S56, one is subtracted from the reprint number stored associated with the print data to update the reprint data. Then, at an appropriate timing, the updated reprint data is written as a new reprint number in the header information of the corresponding print data set in the print data storage region 214a. For example, if a reprint process is performed in S55 for the print data set 1 show in FIG. 9, then the present reprint number of 5 will be subtracted by 1 and updated as 4.

Next, in S57, it is judged whether or not the reprint number updated in S56 is zero or not. If it is judged in S57 that the reprint number is not zero (S57:NO), then the routine returns to S54.

On the other hand, If the judgment in S57 determines that the reprint number is zero (S57:YES), then in S58 the corresponding print data is deleted from the print data storage region 214a. As a result, the amount of the empty region in the print data storage region 214a is increased by the amount of the print data that was deleted in S58.

Although according to present embodiment one is subtracted from the reprint number in S56, instead the number of times that a reprint process is performed for a particular set of print data can be counted, and then it can be judged whether or not the reprint number has reached the number. However, in general, these two methods are substantially the same.

Figure 12:
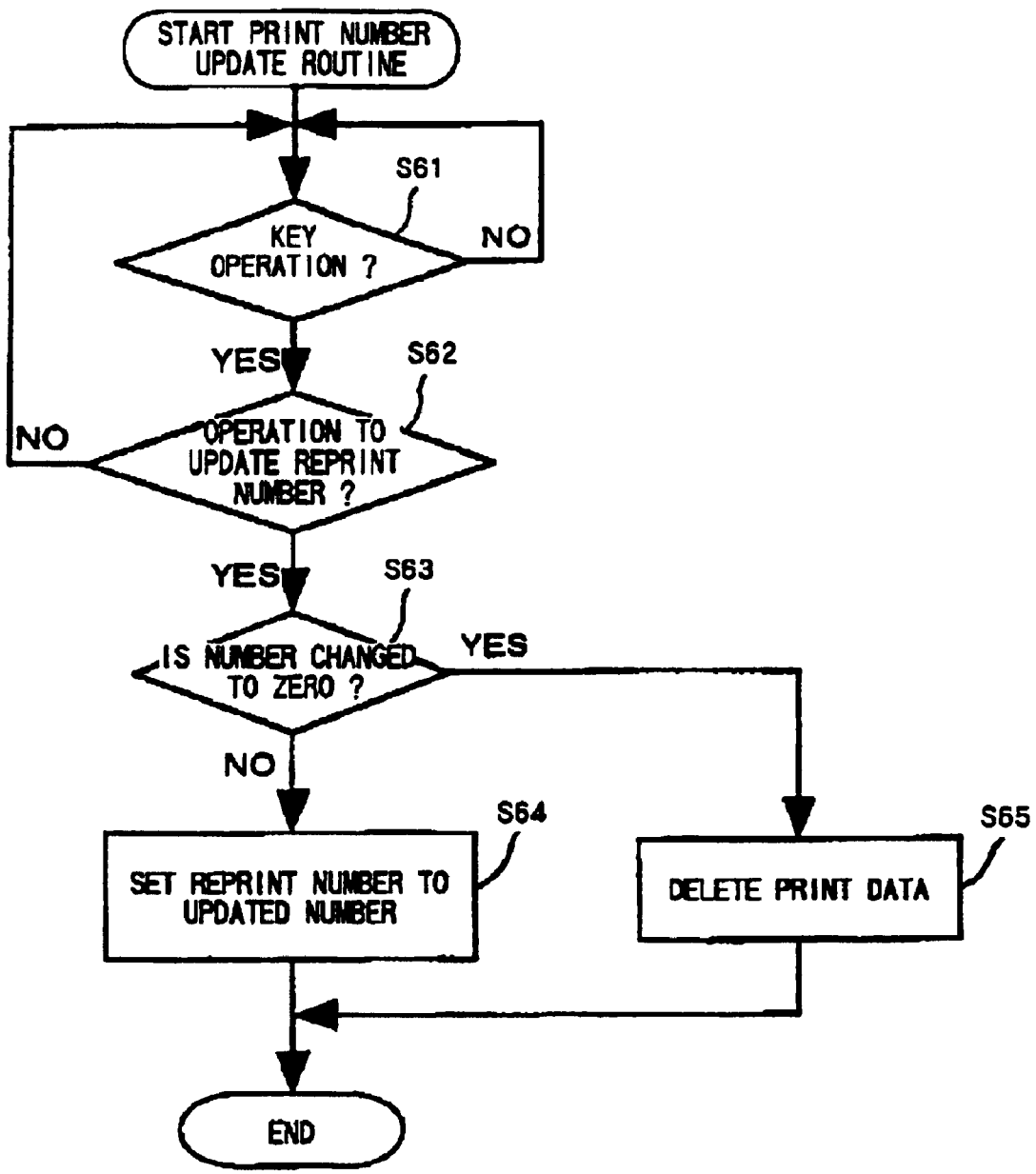
FIG. 12 is a flowchart showing a print number update routine performed by the network printer of the printing system of FIG. 8.

FIG. 12 is a flowchart representing processes performed in the network printer 201 for updating the reprint number. According to the second embodiment, the reprint number set for each set of print data can be updated from the client device 2. The flowchart of FIG. 12 represents processes for updating the reprint number after the print data is stored in the print data storage region 214a.

In S61, it is determined whether or not a key was operated at the input portion 16 of the network printer 201. If so (S61:YES), then in S62 it is determined whether or not the key operation was for updating the reprint number. If not (S62:NO), then the routine returns to S61 and waits for the user to perform such a key operation at the Input portion 16.

Next, an example will be provided for a key operation that the user can perform at the input portion 16 for updating the reprint number. First, the user inputs a command code for updating the reprint number. Then, the user inputs a number for print data stored in the print data storage region 214a. Then, after selecting a specific set of print data in this way, the user inputs a value for updating the reprint number to a new desired value. Based on this inputted data, it can be judged in S62 that a key operation for updating the reprint data was performed.

When it is determined in S62 that a key was operated to update the reprint data (S62:YES), then in S63, it is judged whether or not the updated value inputted for the reprint number is zero.

If in S63 it is judged that the updated value for the reprint number is not zero (S63:NO), then in S64, the updated value is set as a new reprint number. That is to say, the updated reprint number is written into the print data storage region 214a in the header information of the corresponding print data. Accordingly, the number of reprints can be easily changed taking user's situation into the consideration. Processes for reprinting and deleting print data can be flexibly controlled according to the situation of the user.

On the other hand, when it in determined in S63 that the updated reprint number is zero (S63:YES), then in S65, the print data that corresponds to the updated reprint number is deleted from the print data storage region 214a. That is to say, when the reprint number is zero, then no further reprint processes will be performed so there is no need to maintain the corresponding print data in the print data storage region 214a. Therefore, the print data is deleted. Accordingly, print data that is scheduled for reprinting processes will not be unnecessarily stored once those reprint processes are no longer required and instead will be quickly erased.

It should be noted that the embodiment described that S61 to S65 are executed in the network printer 201. However, the system can be designed so that the same processes are performed in the client device 2. In this case, the updated reprint number is transmitted from the client device 2 to the network printer 201.

It should be noted that configuration can be provided for preventing the reprint number from being updated. For example, a reprint number update prevention command can be inputted from the input portion 16 of the network printer 201 or the input portion 26 of the client device 2. When the reprint number is prevented from being updated in this manner, the number of times that printing is performed based on print data is limited to one fixed number or less. After reprinting is performed the fixed number of times, then the print data is reliably deleted from the memory 4.

Because the number of possible reprint operations that has already set will be maintained, after printing has been performed for print data a predetermined number of times, reprint operations and canceling operations can be performed to suitably handle such situations as when the user wishes to reliably delete print data or when the user does not wish to print based on the print data more than a predetermined number of times.

According to the second embodiment, print data set with a reprint number is transmitted from the client device 2 to the network printer 201 and stored in the memory in the print data storage region 214a of the memory 214. The number of times that a reprint command is received from the client device 2 and that the print data is reprinted is counted. once the number of times that the print data is reprinted has reached a set reprint number, then the print data is deleted from the print data storage region 214a.

With this configuration, print data which will probably not be used is automatically deleted without the operator performing any troublesome operations at the client device 2. Therefore, print data will not remain in the print data storage region 214a when there is no need to reprint based on the print data. Therefore, sufficient amount of empty space will be secured in the print data storage region 214a. There will always be sufficient room for new print data in print data storage region 214a. The reprint function if the printing system can be performed more smoothly and more reliably. The printing system with this configuration effectively uses print data, is highly reliable, and is very convenient for users.

In the embodiment, the reprint number set in the print data received by the network printer 201 is stored appended to the print data as header information in the print data storage region 214a of the memory 214. However, the reprint number can be information added to the print data and stored in a predetermined memory region.

Next, a printing system according to a third embodiment of the present invention will be described while referring to FIGS. 13 to 17. The printing system of the third embodiment has substantially the same configuration as the printing system of the second embodiment, so the following explanation will be provided for only dissimilar components and operations. For example, the printer 210 of the second embodiment is replaced with a printer 301 having substantially the same configuration as that of the printer 201 of the second embodiment, except that the memory 214 is replaced with a memory 314.

Figure 13:
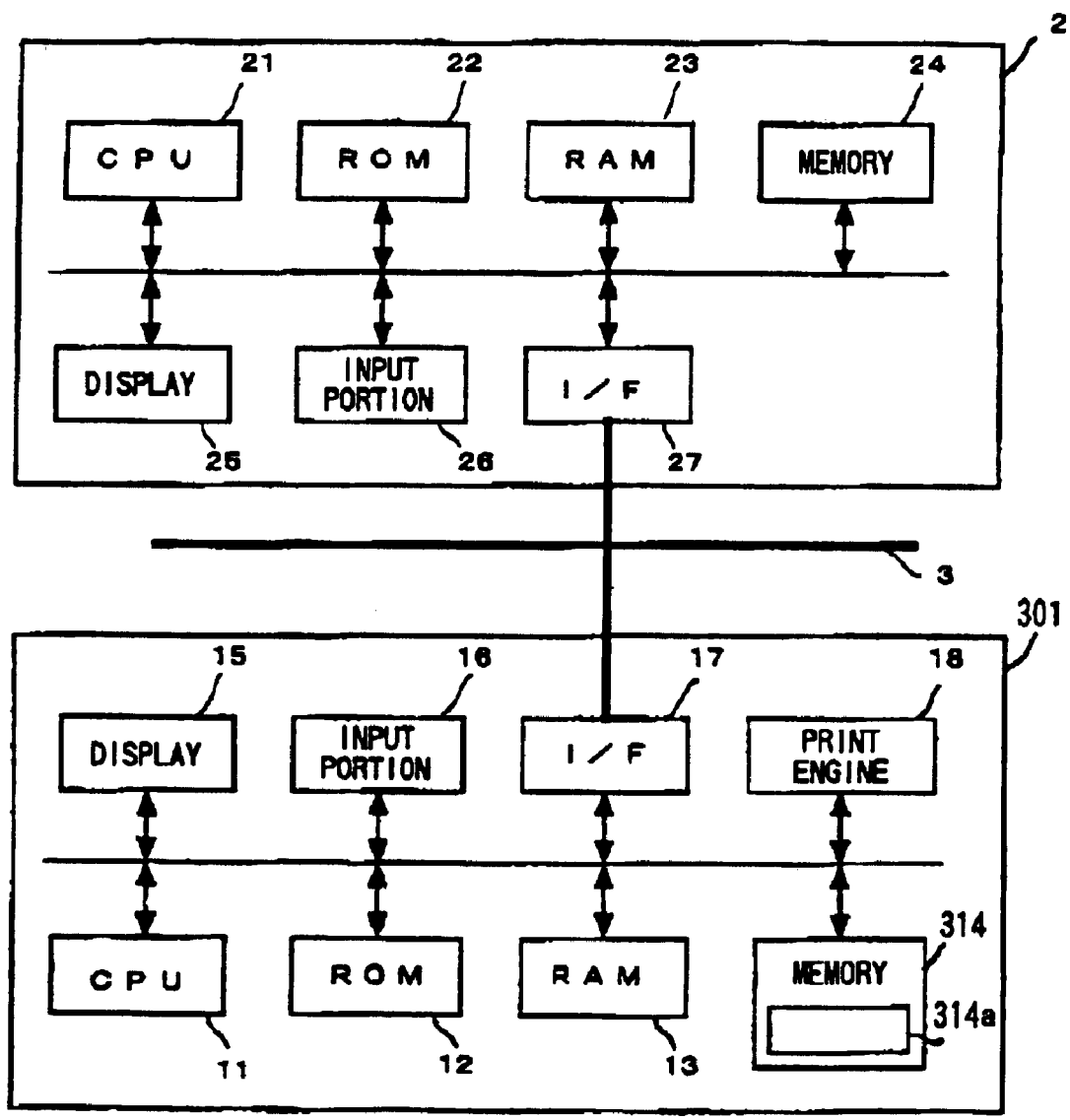
FIG. 13 is a block diagram showing a printing system according to a third embodiment of the present invention.

The memory 314 can be any rewritable memory for storing a variety of large size sets of data. The memory 314 could be a hard disk as described above, or could be a freely detachable memory card or a flash RAM. As shown in FIG. 13, the memory 314 includes a spool region 314a for storing print data. Print data transmitted from the client device 2 is serially stored by print job in the spool region 314a. In addition, unnecessary print data is deleted from the spool region 314a by processes to be described later.

A reference data size is preset for the spool region 314a. The reference data size serves as a reference for determining when a deletion process to be described later is to be performed on print data stored in the spool region 314a. That is, the reference data size designates an upper limit to the size of the memory region where print data sets can be stored. As will be described later, whether or not the amount of print data stored the spool region 314a exceeds the reference data size is determined each time a new print data set is spooled into the spool region 314a. When the reference data size is exceeded, then a print data set selected according to a predetermined condition is deleted from the spool region 314a. According to the present embodiment, the reference data size is set to a predetermined ratio of the total data capacity in the memory 314 that provides sufficient leeway.

Next, an example of print management information of the printing system will be described while referring to FIG. 14. The print management information is used to manage a variety of print data sets transmitted one at a time from the client device 2 to the network printer 301 and spooled into the spool region 314a in this order by print job. That is to say, conditions for a variety of print processes are set as the print management information for each set of print data stored in the spool region 314a. The print management information and the corresponding print data are managed in association with each other. The print management information is stored appended to the print data 24 in the present embodiment. However, the print management information could be stored in a different region of the memory 314.

FIG. 14 is a schematic view representing print management information according to the present embodiment. As shown in FIG. 14, the print management information includes a PRINT DATA SET IDs a to d that indicate each set of print data. For each PRINT DATA SET ID, the print management information includes "SIZE OF DATA SET" information, "WHEN SPOOLED" information, "WHEN LAST PRINTED" information, and "WHEN DELETION ACCEPTABLE" information. Although FIG. 14 shows print management information for only five sets of print data, the print management information can be provided for many more sets of print data. Also, although FIG. 14 shows only four categories of information for each set of print data, other categories can be provided for each set of print data.

The "SIZE OF DATA SET" category in the print management information of FIG. 14 indicates the data size of each print data set stored in the stored region 314a. Assuming that the print data received from the client device 2 is subjected to conversion processes, such as bitmap development, then the data size category in the print management information corresponds to the data size of the converted print data. As will be described later, the data size is retrieved for all print data sets when the total size of all print data sets is determined.

The "WHEN SPOOLED" category indicates the time and date when the print data transmitted from the client device 2 was stored in the spool region 314a. As can be understood from FIG. 14, the print management information for different sets of print data is stored in the order in which the print data sets were spooled into the spool region 314a.

The "WHEN LAST PRINTED" category indicates the time and date when each of the print data sets stored in the spool region 314a were printed out as a result of print command. When the same set of print data was used to print out several times, then the "WHEN LAST PRINTED" category indicates the time and date at the last printing.

The "WHEN DELETION ACCEPTABLE" category indicates the time and date when the print data can be deleted after it has been stored in the spool region 14. In the present embodiment, the user sets the time and date when deletion is acceptable from the client device 2. However, the user can perform this setting operation from the network printer 301 instead.

Although not shown in the drawings, the network printer 301 includes a clock used when setting the "WHEN SPOOLED" and "WHEN LAST PRINTED" categories. The CPU is able to judge the present time and date using this clock.

Figure 15:
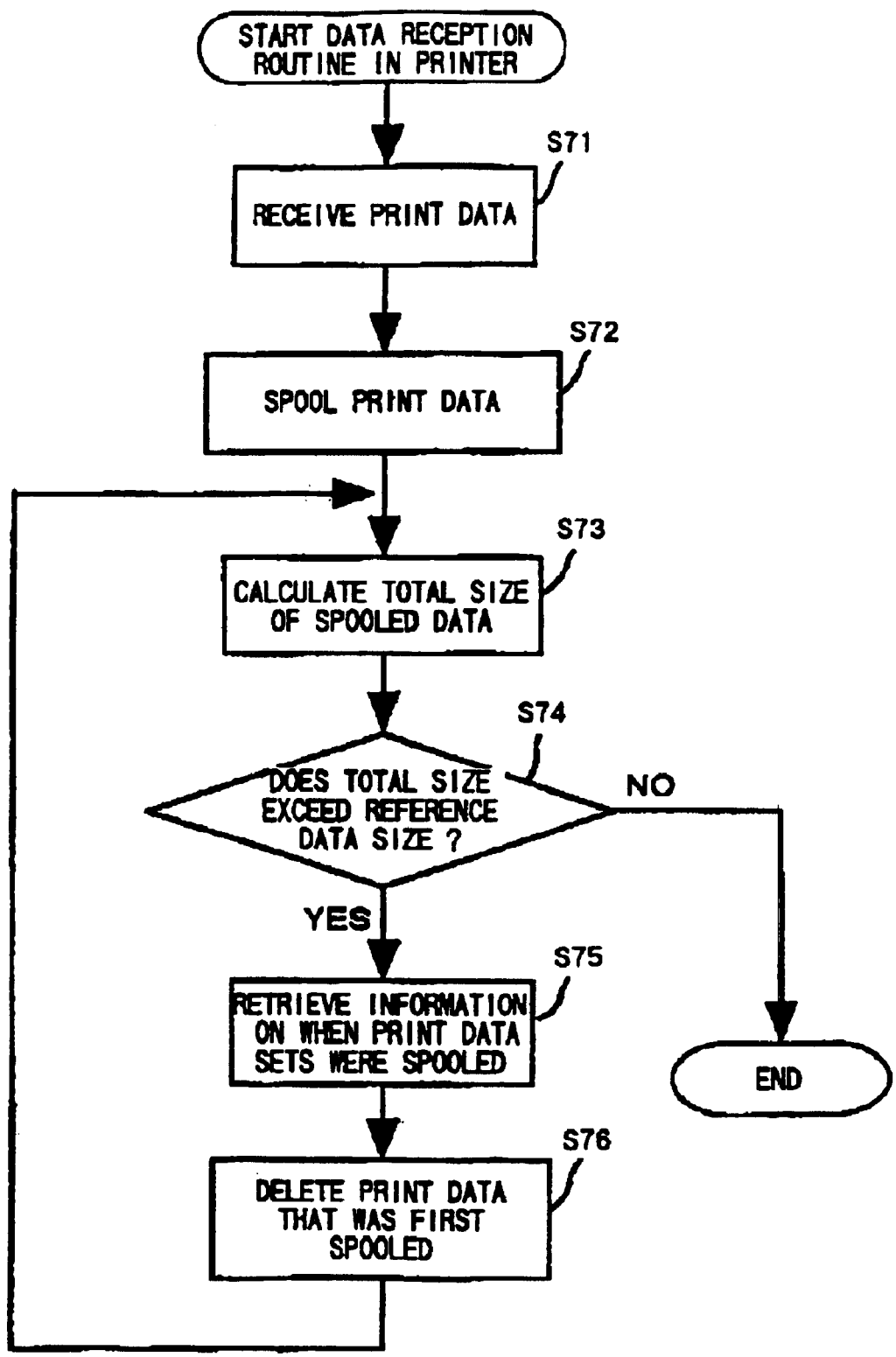
FIG. 15 is a flowchart showing an example of a data reception routine performed by the network printer of the printing system in FIG. 13.
Figure 16:
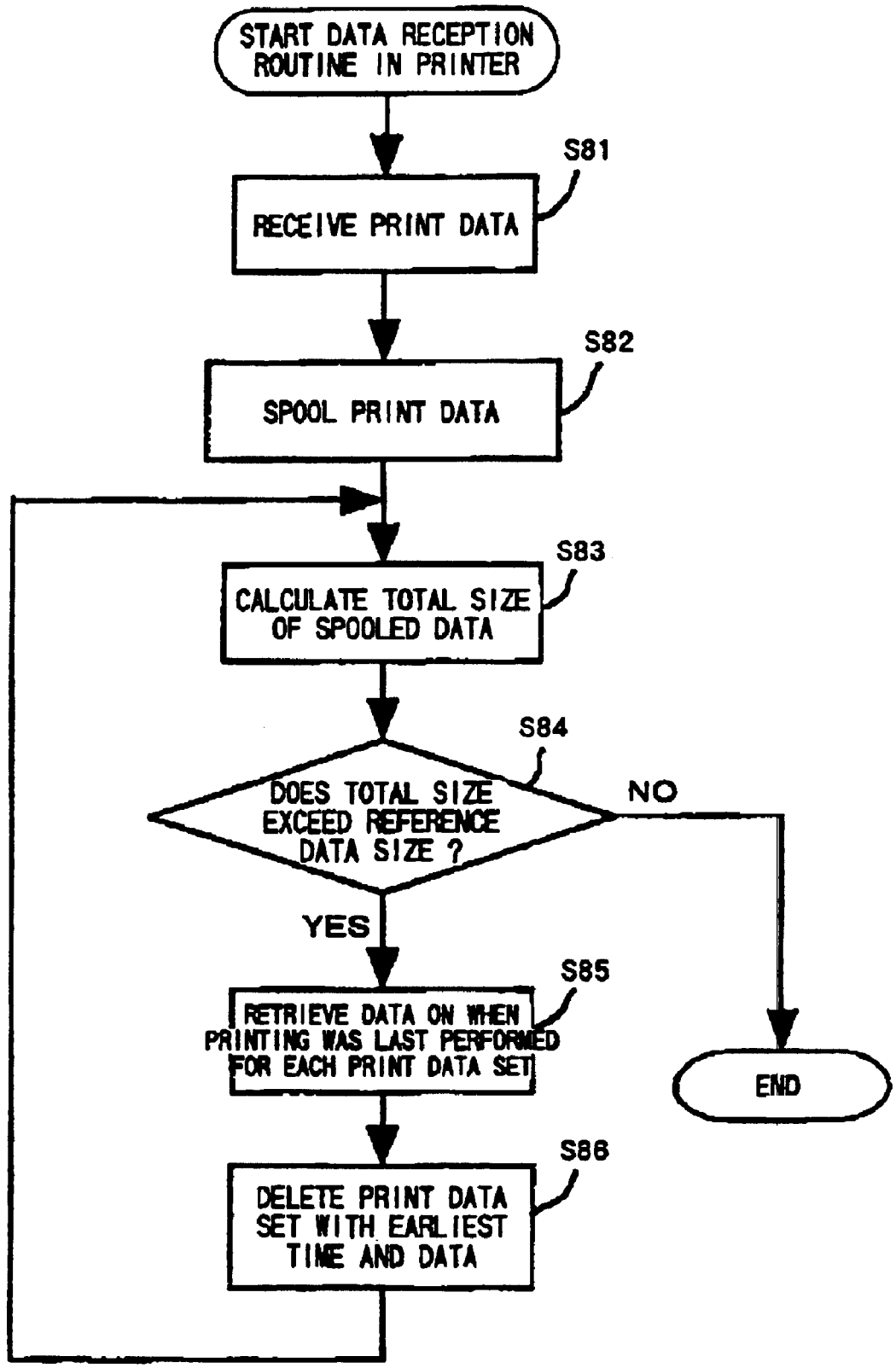
FIG. 16 is a flowchart showing another example of a data reception routine performed by the network printer of the printing system in FIG. 13.
Figure 17:
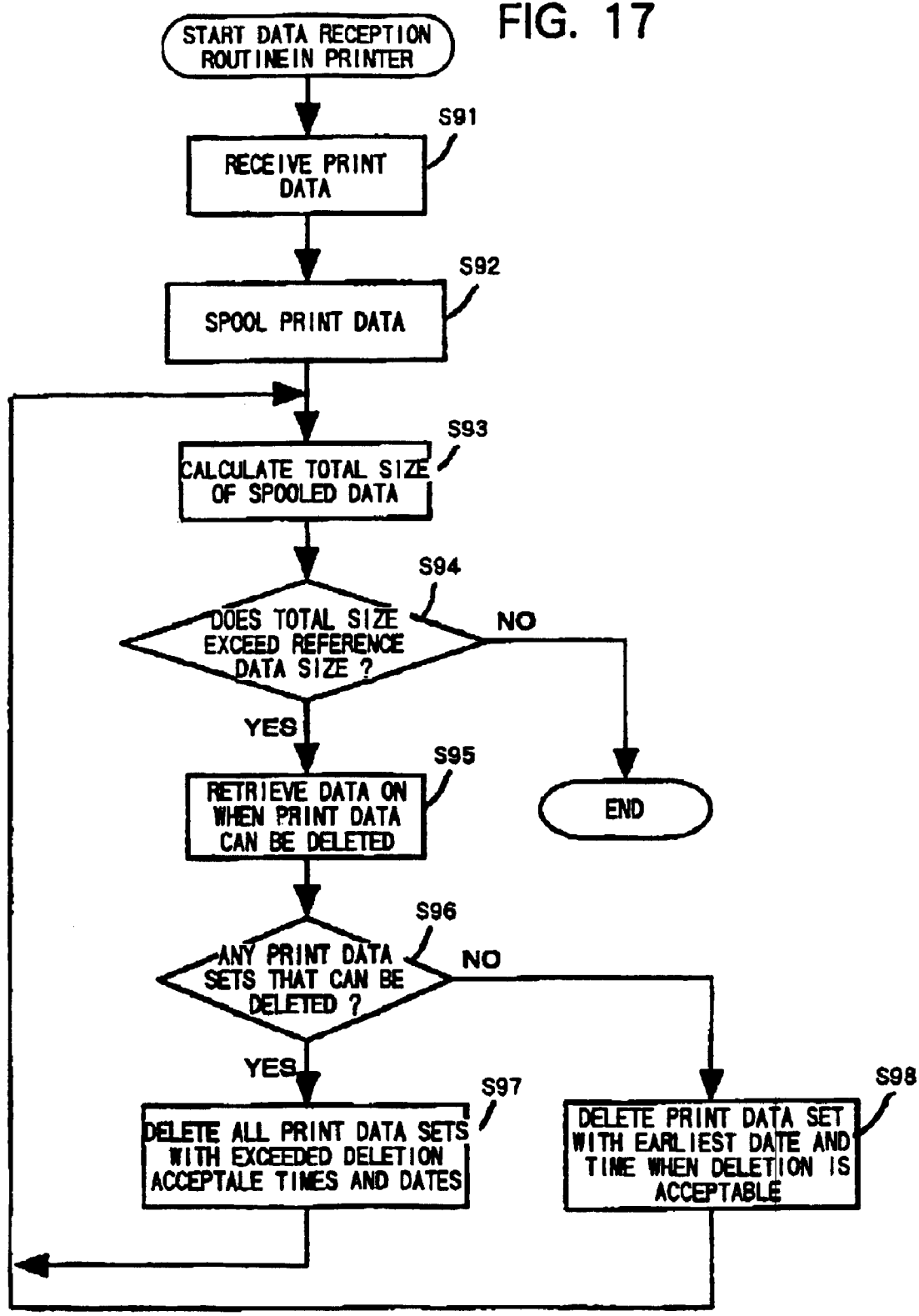
FIG. 17 is a flowchart showing still another example of a data reception routine performed by the network printer of the printing system in FIG. 13.

Next, the deletion processes performed on print data in the spool region 314a according to different aspects of the present embodiment will be explained while referring to FIGS. 15 to 17. The deletion process of the present embodiment prevents all free area in the spool region 314a from being used up when print data sets are transmitted one at a time from a plurality of client devices 2 and serially stored in the spool region 314a, which has a limited capacity. The flowchart of FIGS. 15 to 17 represent processes performed on a single set of data transmitted from the client device 2. The print data is prepared by the user using application software in the client device 2 and is transmitted to the network printer 301 in association with a print command.

FIG. 15 is a flowchart representing a first example of the deletion process for deleting print data sets from in the spool region 314a based on a predetermined condition. In this example, the predetermined condition is which print data set was spooled first. First, in S71, print data transmitted from the client device 2 is received in the network printer 301 across the network 3.

In S72, each set of received print data is managed as a print job and the sets of print data are consecutively stored in the spool region 314a of the memory 314. At this time, the print data is subjected to development processes, for example, to put the print data into a data format that can be processed by the network printer 301. At this stage, the printing command can be immediately executed for the print data so that the print engine 18 actually prints out based on the received print data.

In S73, the total size of all the print data sets stored in the spool region 314a is calculated. In the example shown in FIG. 14, the total size of all the print data sets a to e stored in the spool region 314a will be calculated in S73 as 27 MB. It should be noted that the data size of each print data set can be included in the print management information in the manner described above or can be calculated in some other manner without using print management information.

In S74, the total size calculated in S73 is compared with a reference data size to determine whether the total size exceeds the reference data size. For example assuming that the reference data size is set to 20 MB, then in the example of FIG. 14 the total size of 27 MB will be judged in S74 to exceeds the reference data size.

If it is judged in S74 that the total size of print data does not exceed the reference data size (S74:NO), then the present routine is ended without deleting any data from the spool region 314a. On the other hand, when the judgment in S74 determines that the total size of print data exceeds the reference data size (S74:YES), then in S75, the "WHEN SPOOLED" information is retrieved from print management information stored in the memory 314, in order to select which print data set or sets are to be deleted.

Next, in S76, while referring to the "WHEN SPOOLED" information retrieved in S75, the print data set with the earliest spooling time is selected from the print data information in the spool region 314a and deleted from the spool region 314a. In the example shown in FIG. 14, the print data set a is the data set with the earliest spooling time and date of all the print data sets a to e. Therefore, the print data set a is selected and deleted in S76. In other words, the oldest print data is deleted and newer print data is maintained. As a result, each set of print data can be maintained for a sufficient storage time and then deleted at an appropriate deletion time.

After the deletion processes in S75, the program again returns to S73 and the processes of S73 to S76 are repeated. In other words, one set of print data at a time are deleted from the spool region 314a until the total size of print data stored in the spool region 314a is reduced to less than the reference data size. In the example shown in FIG. 14, the total size of print data in the spool region 314a will be reduced to 26 MB when the earliest spooled print data set a is deleted. However, this total size of 36 MB will still be greater than the reference data size of 20 MB. Further even if the print data set b is also deleted, the total size will still be 23 MB, which is also larger than the reference data size of 20 MB. Once the third print data set c is deleted, then the total size of print data will be 13 MB, which is lower than the reference data size of 20 MB. At this point, the judgment in S74 will result in a negative determination. In other words, in the example shown in FIG. 14, the deletion routine represented in the flowchart in FIG. 15 is continued until three print data sets a to c are deleted.

FIG. 16 is a flowchart representing a second example of deletion processes for deleting print data from the spool region 314a based on a predetermined condition. In this example the predetermined condition is which print data set was last printed out on the earliest date. In the flowchart of FIG. 16, S81 to S84 represent processes that are substantially the same as those represented by S71 to S74 of the first example described with reference to FIG. 15. Therefore, their detailed explanation will be omitted.

When it is determined in S84 that the total data size exceeds the reference data size (S84:YES), then in S85, the "WHEN LAST PRINTED" information is retrieved from the print management information stored in the memory 314.

Based on the "WHEN LAST PRINTED" information retrieved in S85, in S86 the print data set with the earliest time and date when it was last printed out is selected from the print data sets in the spool region 314a and deleted from the spool region 314a. In the example shown in FIG. 14, the print data set b has the earliest date for when it was last printed of the print data sets a to e. Therefore in S86, the print data set b is selected and deleted. In other words, print data that has not been used to print for a long period of time is deleted and print data that has been recently used to print out is maintained. Therefore, print data can be deleted taking the use consideration of the print data.

After the deletion process of S86, then in the same manner as described for the first example with reference to FIG. 15, S83 to S86 are repeatedly performed until the total size of the print data stored in the spool region 314a is reduced to less than the reference data size. In the example shown in FIG. 14, the total data size will be reduced to 24 MB by deleting the print data set b. Because this is not lower than the reference data size of 20 MB, then the next earliest print data set c which has a next earliest last printing date is deleted, whereupon the total size of print data in the spool region 314a is reduced to 14 MB. At this time, the total size of data stored in the spool region 314a will be less than the reference data size, so that the S84 will result in a negative determination. In other words, with the example of FIG. 14, the deletion process of flowchart in FIG. 16 will be repeated until two print data sets b and c are deleted.

Next, a third example of deletion processes performed on the print data stored in the spool region 314a based on a predetermined condition will be described while referring to the flowchart in FIG. 17. In this example, the predetermined condition is whether or not a print data set can be deleted or not. The processes performed in S91 to S94 of the flowchart in FIG. 17 are substantially the same as the processes performed in S71 to S74 of the flowchart in FIG. 15, so their detailed explanation will be omitted.

When it is determined that the total data size of the print data in the spool region 314a exceeds the reference data size (S94:YES), then in S95, the date and time when the print data can be deleted is retrieved from the print management information stored in the memory 314.

In S96, the "WHEN DELETION ACCEPTABLE" information retrieved in S95 is referred to judge whether any of the print data sets can be deleted from the spool region 314a. In other words, whether or not the present time and date is after the time and date set for each print data set is determined. Those print data sets with expired deletion acceptable time and date can be deleted.

If it is determined that one or more of the print data sets can be deleted (S96:YES), then in S97, all the print data sets that are determined as deletable in S96 are actually deleted from the spool region 314a. Although in the present embodiment all print data sets that can be deleted are actually deleted, only a single print data set can be selected and deleted from those print data sets judged to be deletable. In this case, the print data set with the earliest spooling time or the earliest last printing time can be selected and deleted from all the deletable print data sets.

When none of the print data sets are deletable (S96:NO), then the print data set with the earliest deletable time is selected and deleted from the spool region 314a in S98. In this way, when all of the print data sets have a deletable time that is after the present time, the a priority is given to securing sufficient free space for storing new print data in the spool region 14. In other words, unnecessary print data can be deleted while taking the user's desire into the consideration. Therefore, the system is very convenient for the user.

After deletion processes are performed in S97 or S98, then in the same manner as in the first and second examples described above, the processes of S93 to S98 are repeatedly executed until the total size of print data stored in the spool region 314a is reduced to less than the reference data size.

For example, assuming that the process of the flowchart in FIG. 17 are performed when the print data set e of FIG. 14 is spooled into the spool region 314a, that is at 15:15 on Aug. 23, 1999, the only print data set with a deletable time that exceeds the present time is print data set b. Therefore, in S96, the print data set b is deleted from the spool region 314a. As a result, the total size of print data in the spool region 314a will be reduced to 24 MB. However, this is still larger than the reference data size of 20 MB, so that S94 will result in a positive determination. When S98 is repeated as a result, then the print data set d which indicates the earliest deletable time will be deleted from the spool region 314a. At this point, the total size of print data will be reduced to 19 MB so that S94 will result in a negative determination. As a result, two print data sets b and d will be deleted from the spool region 314a.

It should be noted that in the third example shown in FIG. 17 can be applied in combination with the first and second examples of FIGS. 15 and 16. For example, processes of S97 can be retained while exchanging the processes of S98 with the processes of S75 and S76 of FIG. 15 or the processes of S85 and S86 of FIG. 16.

In the manner described above, according to the present embodiment, when print data transmitted from the client device 2 to the network printer 301 is stored in the spool region 314a of the memory 314, the total size of the print data already stored in the spool region 314a is determined. When the total size is judged to exceed a preset reference data size, then print data sets that are selected according to predetermined conditions in the print management information are deleted from the spool region 314*a*. For this reason, unnecessary print data is automatically deleted without the user having to operate the client device 2 for such deletion processes. The fixed amount of empty area can always be properly secured in the spool region 314*a*. There is no fear that the capacity of the spool region 314*a* will be exceeded so that no new print data can be spooled. Therefore, printing control can be more smoothly performed. The system is much more reliable and more convenient for the user of the client device.

Although three examples were given for conditions referred to when deleting print data from the spool region 314*a*, other predetermined conditions included in the print management information can be used to make this determination about deletion. In other words, the conditions for deleting printing management information can be freely set. Therefore, deletion processes that are appropriate for the present situation of the printing system can be easily realized.

Also, in the present embodiment, the total size of print data stored in the spool region 314*a* is calculated and compared with a reference data size. However, instead of calculating the total size of print data, the number of print data sets stored in the spool region 314*a* can be counted and compared with a reference number. Normally, the average data size of print data sets is a fairly fixed value. Therefore, the total size of data can be estimated by determining the number of print data sets by setting an appropriate reference number. The same good effects can be achieved as when comparing total data size with a reference data size. Accordingly, by comparing the number of print data sets with a reference number in this manner, sufficient empty area can be secured in the spool region 314*a* and deletion processes can be simplified.

According to the present invention, when the total data size exceeds the reference data size when storing several print data sets in the spool region 314*a*, print data is selected according to a predetermined condition and deleted. Therefore, the capacity of the spool region will not be exceeded without the user needing to perform any troublesome operations. Therefore, the printing system is more convenient and processes can be executed more smoothly.

Next, a printing system according to a fourth embodiment of the present invention will be described while referring to FIGS. 18 to 21. The present embodiment describes the present invention applied to a printing system S with client devices 160, 170, 180 and printers 110, 130, 140 connected by a network W, wherein the network W is managed by the World Wide Web (WWW) protocol. The WWW protocol is used in a wide regional information system capable of accessing a variety of information by building hyper text on the network.

Here, WWW will be briefly described. WWW is an information system for managing network managing information of terminal devices, such as printers in the present embodiment, in a unified manner at a remote computer. The remote computer is installed with a program called WWW browser, which is for serially browsing setting conditions and the like for each terminal device, one terminal device at a time. The WWW browser enables each computer to browse conditions of a variety of terminal devices, grasp the conditions, and use this information to control the network.

In each of these terminal devices, images and character information are expressed using a program called hypertext. A hypertext program uses a language called hypertext markup language (HTML). A hyper text transfer protocol (HTTP) is user as a protocol for transmitting between the computers and the terminal devices.

The printer 110 according to the present embodiment is provided with a network interface card (NIC). The printer 110 is connected to a network W in a hardware hierarchy. A common gateway interface (CGI) program is installed in a ROM 112 of the printer 110. The CGI program configures HTML that corresponds to a command from a computer and interprets information called form generally transmitted from the computer. For example, when the user of the computer sets the number, of sheets to be printed by the printer to 5, the computer will transmit the form "COPIES=5" to the CGI program of the printer.

The remote computer distinguishes and indicates each printer using distinction information called universal resource locator (URL). Each computer and printer is set with a specific URL. A remote computer can designate a particular printer by designating the URL of the printer. According to the present embodiment, each printer is allotted with a different IP address. It is assumed in the present embodiment that the user knows the IP address of each printer. Accordingly, the IP addresses are used according to the present embodiment to designate URLs.

Figure 18:
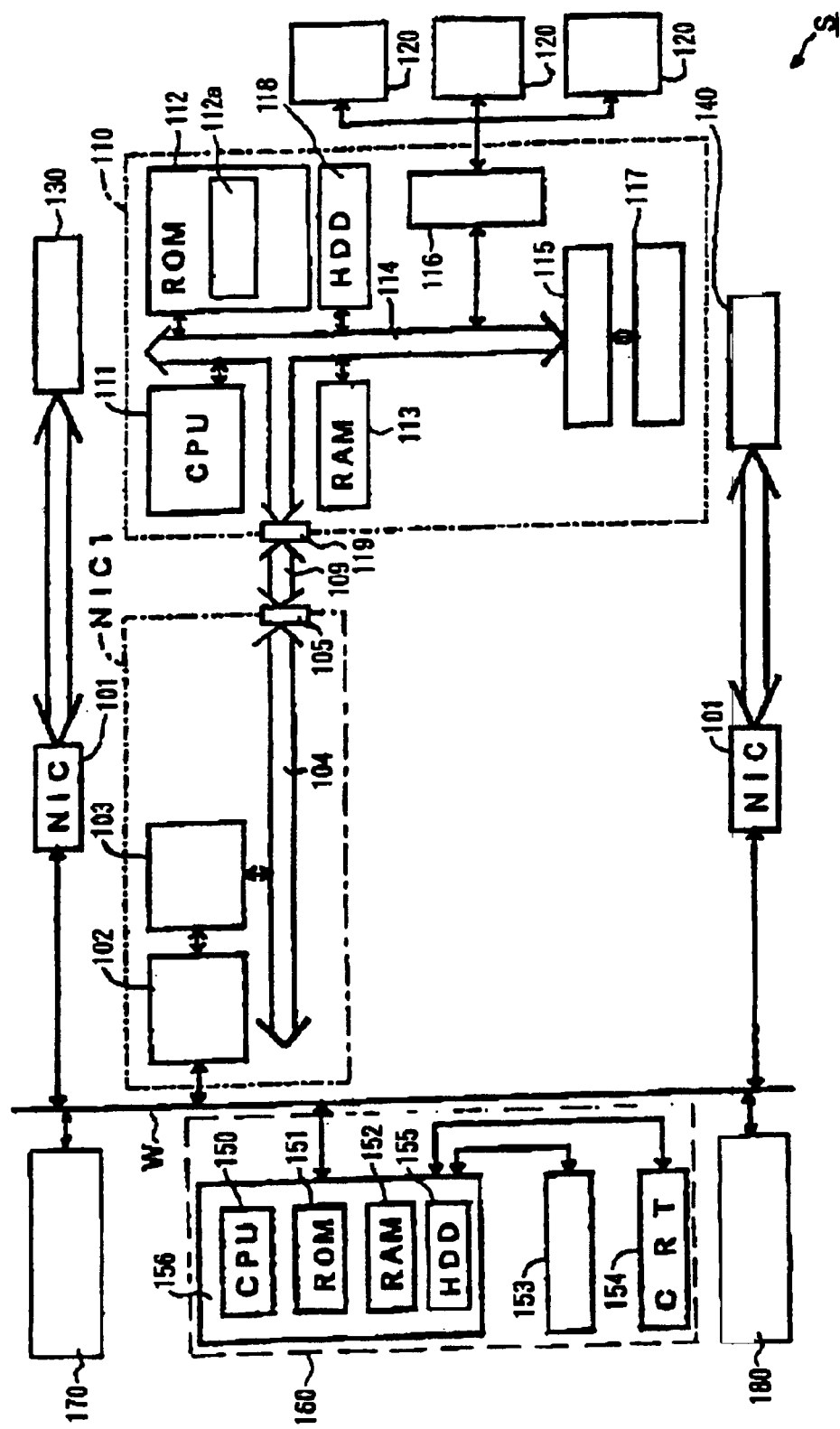
FIG. 18 is a block diagram showing a printing system according to fourth embodiment of the present invention.

Next, the printing system S according to the present embodiment will be described while referring to FIGS. 18 to 21. As shown in FIG. 18, the printing system S includes client devices 160, 170, 180, a network W, such as a telephone circuit or LAN, a plurality of network interface cards (NIC)101, printers 110, 130, 140, and a plurality of client devices 120 connected to the printer 110. According to the present embodiment, the printers 110, 130, 140 are the same model.

Each client device 160 includes a computer body 156, a mouse 153, and a cathode ray tube (CRT) 154. The computer body 156 includes a CPU 150, a ROM 151, a RAM 152, and a hard disk 155. The hard disk 155 of the client device 160 stores a word processing software for preparing text and the like for printing. In addition, the hard disk 55 is installed with a WWW browser, and print drive software for controlling the printers 110, 130, 140. The printer driver software stored in the hard disk 155 includes programs for transmitting print data and printing management information data, and for browsing and amending the print management information data. These programs are recorded onto an information memory medium, such as a floppy disk or a compact disk (CD), and also installed in the hard disk 155 of the client device 160 in a condition that enables their activation by the client device 160. Although not shown in the drawings, each of the client devices 170, 180 have the same configuration as the client device 160 and are all connected to the network W.

The printer 110 includes a CPU 111, a ROM 112, a RAM 113, a bus 114, an output interface 115, an input interface 116, a printing portion 117, and a hard disk drive (HDD) 118.

A common gateway interface 12*a* is prestored in the ROM 112. The hard disk 118 according to the present embodiment is PCMCIA card detachable from the printer 110. Print data and print management information data transmitted from the client device 160, 170, 180 is stored in the hard disk drive 118. Further, the plurality of client devices 120 are connected to the bus 114 of the printer 110 through the input interface 116.

The printers 130, 140 have the same configurations as the printer 110. However, none of the client devices 120 is connected to the printers 130, 140.

The NIC 101 is connected to the printers 110, 130, 140 through a connection line 119, which is connected to the bus 114. The NIC 101 is provided with a transceiver 102, a RAM controller 103, and a bus 104.

Next, processes for transmitting and storing print data and print management information data from the printing system S will be described while referring to FIG. 18. The following explanation will be for processes performed in the printer 110 and the printer 160 across the corresponding NIC 101. However, the same processes are performed between the client device 160 and the printers 130, 140 using the other NICs 101 and also between the client device 170, 180 and the printers 110, 130, 140.

First, processes for transmitting print data input management information will be explained. According to these processes, print data and print management information data from the client device 160 is transmitted to the printer 110 and stored in the hard disk drive 118 of the printer 110.

To execute these processes, an application, such as a word processing software, is started up in the client device 160 and a print menu is selected using this application. When the print menu is selected in this way, a dialog is displayed for indicating selection of a printer, for indicating that printing processes should be started, and the like. The user then selects the printer using this dialog.

The dialog includes a property button. When the user selects the property button, then a property sheet is displayed on the CRT 164. The property sheet includes a variety of Information, such as TRANSMITTER'S NAME, TRANSMISSION TIME, DELETION TIME, and NOTIFICATION CONTACT.

The TRANSMITTER'S NAME is automatically inputted with the name designated in the client device as the user who transmits print data. The TRANSMISSION TIME is automatically inputted using the calendar function of the client device.

The DELETION TIME is information inputted by the user to indicate when data stored in the hard disk of the printer is to be automatically deleted. Printers with a spool function can store a great deal of data. Therefore, the printer can reprint based on the same data without the need of the client device to resend the same data again. However, if unnecessary data is retained for a long period in the HDD of the printer, then the usable capacity of the HDD is reduced by unnecessary data. Therefore, the printer cannot be efficiently used. According to the present embodiment, the deletion time data is transmitted simultaneously with the print data as the part of the print management information data. The printer automatically erases the corresponding print data based on this deletion time data.

The NOTIFICATION CONTACT is information inputted by the user to indicate who should be notified about completion of a printing operation. According to the present embodiment, the notification contact is an e-mail address. By inputting an e-mail address as the notification contact, then when the printing operation is completed, the printer 110 will transmit an e-mail message indicating that the printing operation was completed in the body of the e-mail message.

After inputting the information in the property sheet or after confirming that the inputted information is accurate, then the user selects an OK button on the property sheet. As a result, a reprint dialog is displayed on the CRT 154. The user views the dialog to confirm that the printer set to is a desired client device. Once confirmed, the user clicks the OK button on the dialog. Then, as a result, a storage command is transmitted to the printer with print data and print management information data. At this time, a spool name file set by the application is used as the spool file name and is transmitted to the printer 110.

The printer 110 receives such a command and data through the NIC 101. The CPU 111 of the printer 110 then stores the print data and print management information data into the hard disk drive 118 under the spool file name.

Processes for transmitting and storing print data and the print management information data is completed after performing these operations.

Figure 19:
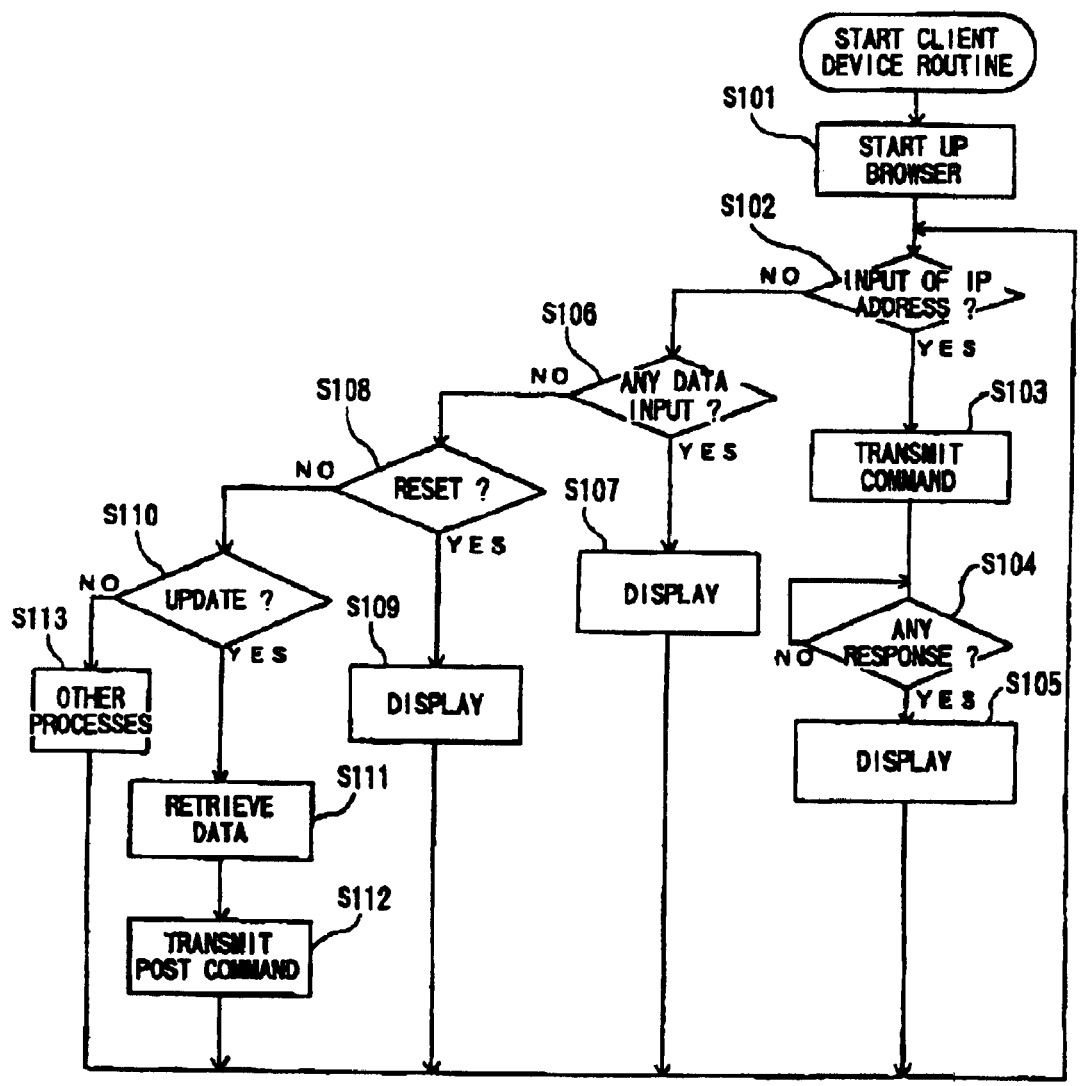
FIG. 19 is a flowchart showing a client device routine performed by a client device of the printing system in FIG. 18.
Figure 20:
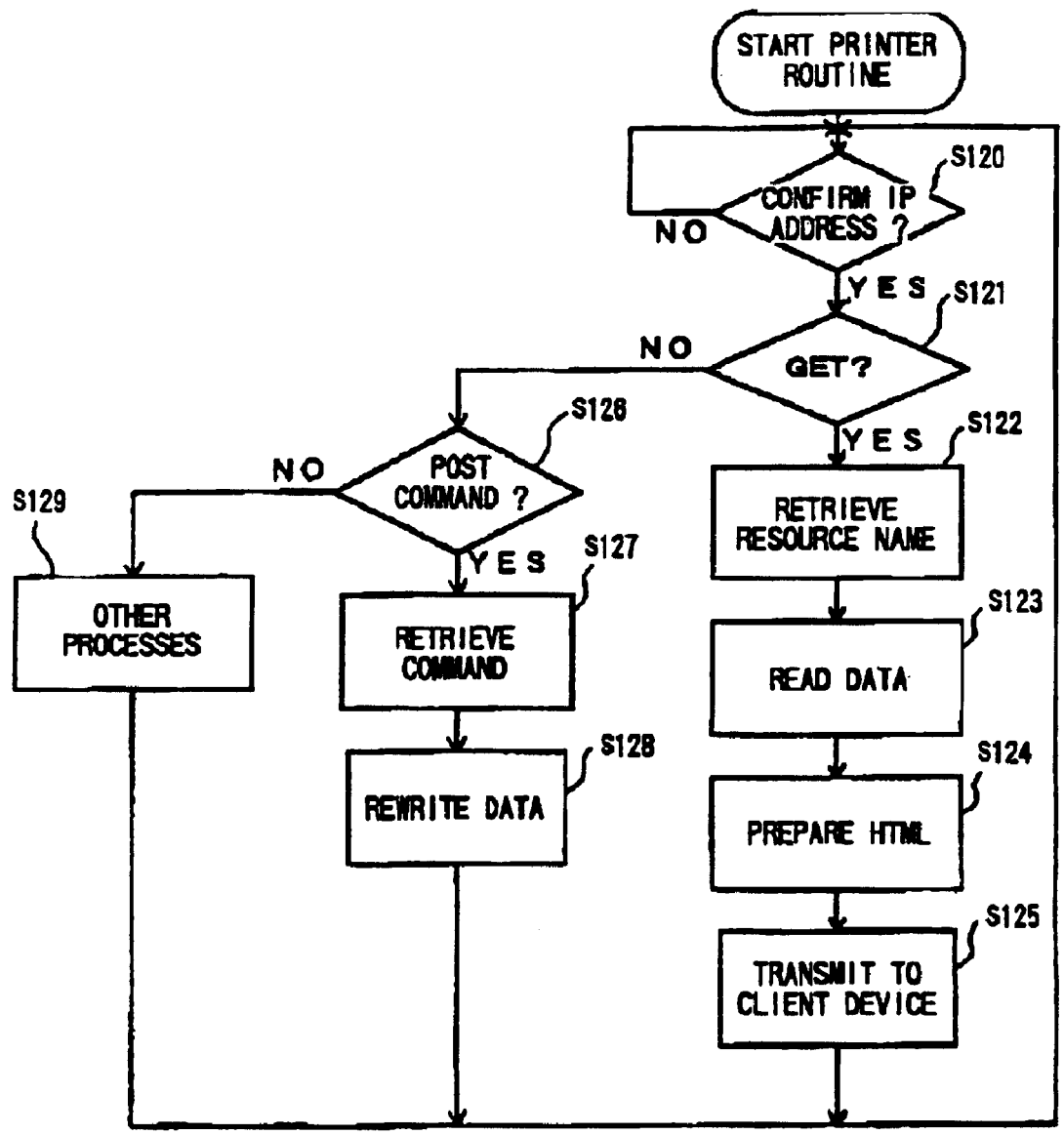
FIG. 20 is a flowchart showing a printer routine performed by a printer of the printing system in FIG. 18.

Next, an explanation will be provided for processes for browsing and amending print management information data while referring to FIGS. 19 to 21.

First, in S101 of the flowchart in FIG. 19, a browser process for browsing print management information data is started up by starting the WWW browser in the client device 160.

Then in S102, it is judged whether or not a URL name or IP address has been inputted. It will be assumed in this example that a URL name or IP address of the printer 110 is inputted in the URL input column of the browser. It is assumed in this example that the user knows each IP address of each printer. For example, according to the present embodiment, the IP address for the printer 110 is (133.151.120.92). When the user inputs the IP address "133.151.120.92" into the URL input column of the WWW browser and presses the return key on the key board (not shown) connected to the client device 160 (S102:YES.), then in S103, the client device 160 generates a retrieve command, such as "GET/133.151.120.92/HTTP/1.0" and the client device transmits the retrieve command to the transceiver 102 of the NIC 101 across the network W.

In this retrieve command, "GET" is a command for retrieving data, and also is a request that information be returned to the transmitter of the command. The IP address "133.151.120.92" designates where the "GET" command should be transmitted. A URL name is used to designate where the command should be sent, when the URL name is inputted in the URL input column of the browser. The notation "HTTP/1.0" is information indicating the HTTP version.

Generally speaking, a URL is information indicating the resource to be managed. In this example, a URL indicates information that is requested. Normally, when the command is transmitted, names indicating a variety of resources are noted in a portion of the URL. However, there is no way to know what resources are available at the printer when a command is first transmitted to a desired printer by indicating its IP address. Therefore, the command is transmitted with only the IP address noted, that is, no resource is noted.

The request received by the NIC 101 is transmitted by the network controller 103 to the printer 110 across the bus 104 and the connection line 109.

When the above-described command is inputted to the printer 110, then in S120 of FIG. 20, the CPU 111 judges whether or not the command includes an IP address that indicates the printer 110. If so (S120:YES), then the CPU 111 picks up the command across the bus 114 and processes the command using the printer CGI 112a stored in the ROM 112. Because the command can be one of several different types, such as a GET command or a POST command, first in S121, the CPU 111 judges whether or not the retrieved command is the GET command. If the command is the GET command (S121;YES), then in S122, the resource's name that is requested by the GET command is retrieved. Then in S123, data corresponding to the resource's name is retrieved from the hard disk drive 118 or data is prepared as needed in the HTML format. In the present example, the retrieved data is print management information data and so includes a spool file name, a transmitter's name, a transmission time, a deletion time, and a notification contact as described above. When the resource name is written in the URL as described above, then in S124, the CPU 111 prepares names of all spool files spooled in the printer 110. For the first spool file of these with respect to the order spooled, the CPU 111 prepares data in the HTML format for the transmitter's name, the transmission time, the deletion time, and the notification contact. In S125, the CPU 111 returns the data prepared in S124 back to the NIC 101 across the connection line 109 and the bus 114. The NIC 101 after receiving this print management information data from the printer 110, transmits the request as is to the printer 160 across the network W.

At this point, the client device 160 receives the print management information data from the printer 110 across the NIC 101 and the network W (S104:YES), and so in S105, uses the WWW browser to display character information and images that correspond to the print management information data on the CRT 154. FIG. 21 shows an example of a print management information screen displayed on the CRT 154 in S105. In this example, a plurality of spool files were spooled into the printer 110. The spool file A.doc was spooled into the printer 110 before all the others. Therefore, in the example shown in FIG. 21, the file names for these spool files are displayed in a selection column 192, with the spool file A.doc displayed first. A scroll button 199 for scrolling through the spool files displayed in the selection column 192 is displayed to the side of the selection column 192. Information for the spool file A.doc is displayed in a transmitter column 193, a transmission time column 194, a deletion time column 195, and a notification contact column 196. The print management information screen enables the user to view the print management information on print data spooled into the printer 110. It should be noted that when the user wishes to view information on other spool files, the user clicks the scroll button 99 to select another spool file. For example, when the spool file B.doc is selected, then the CPU 150 transmits a following command in S113 of FIG. 19:

"GET/133.151.120.92/B.html HTTP/1.0"

The CPU 111 of the printer 110 receives this command and retrieves data for the transmitter, the transmission time, the deletion time, and the notification contact for the spool file name B.doc from the hard disk 118, converts the print management information data into HTML format data, and returns it to the client device 160 in S120 to S125.

When the client device 160 receives the data, the CPU 150 performs the same operations as described above to control the CRT 154 to display a browser screen 190 with information on the transmitter, the transmission time, the deletion time, and the notification contact for the spool file B.doc in S113. In this way, the user can easily view information on any desired spool file in the printer 110.

Next, processes for amending the print management information data will be described. According to the present embodiment, any of print management information data displayed in the manner described above can be easily amended. However, in the present embodiment, the only data that can be amended is the deletion date and the notification contact.

When the user uses the keyboard to input new data into the deletion time column 195 and the notification contact column 196 in order to amend this information (S106:YES), then in S107, the CPU 150 responds to this operation by changing the data in the RAM 152, and displaying new data in the deletion time column 195 and the notification contact column 196 of the browser screen 191. If the user wants to clear the displayed content, and so clicks the reset button 197 of the browser screen 190 using the mouse (S118:YES), then in S109 the CPU 150 changes the data in the RAM 152 in accordance with this operation and displays the deletion time column 195 and the notification contact column 196 of the browser screen 190 in a blank condition. It should be noted that if no deletion time data is set, then the printer 110 will not automatically delete print data. Also, if no notification contact data is set, then the printer 110 will make no notification upon completion of a printing operation.

After the user inputs the correct information, and uses the mouser 153 to click on the update button 198 of the browser screen 190 (S110:YES), then in S111, the CPU 150 responds to this operation by amending information displayed in the print management information screen 190, and retrieves the data corresponding to the updated screen from the RAM 152. Next in S112, the CPU 150 generates an update command shown below and transmits the update command to the transceiver 102 of the NIC 101 across the network W:

"POST/133.151.120.92/A. html HTTP/1.0"

"EXPIRE=nn TO=cc@bbb.co.jp"

"POST" is a command requesting that the receiver of the command requesting the receiver of the post command to update based on data transmitted directly after the post command. In this example the post command is a request for the printer 110 to update deletion time data and the transmitter name data for the spool file A.doc.

"EXPIRE" is a form, and "EXPIRE=nn" indicates that the deletion time should be updated to nn hours after the transmission time. The CPU 150 amends the deletion time shown on the management information screen 190 in the format of year, month, and day. The CPU 150 also automatically calculates the time difference between this amended year, month, and day of the deletion time and the transmission time, and calculates data in units of hour.

"TO" is a form, and "TO=ccc@bbb.co.jp" indicates that the transmitter should be changed to ccc@bbb.co.jp.

When the printer 110 receives the command, and the CPU 111 recognizes that the command as a post command (S126:YES), then in S127, the CPU 111 retrieves the resource name from the post command and further retrieves the content of the forms transmitted in succession with the post command. Then in S128, the CPU 111 rewrites, in the hard disk 118, the deletion time data, the transmitter data, or both data types for the spool file that corresponds to the retrieved resource name.

With this configuration, erasure time is updated to match the amended erasure time from the client device. The erasure time can be easily amended or updated without retransmitting the print management information data, the print data, and a storage command. Therefore, operations can be performed more efficiently without needing to retransmit newly prepared data in accordance with the category to be selected and a new storage command.

According to the present embodiment, not only can a user view print management information data using the WWW browser, but can also rewrite certain data. Therefore, there is no need to again perform store processes for new print data and new print management information data. Operations are more efficient.

Although the fourth embodiment described only the deletion time and transmitter data as being updateable, the present invention is not limited to this configuration. Other print management information data can be updateable. Also, the print management information data is not limited to the above-described examples but can be changed or added to as needed.

It should be noted that any of the embodiments described above for the present invention can be realized in the form of a memory medium that stores print control programs for executing the above-described functions. The memory medium that stores the print control program can be a floppy disk or CD ROM for example, readable by a computer of the printing system. The memory medium, such as the CD ROM described above, is then inserted into the computer and the stored print control program installed onto the computer. The computer then initiates and executes the printer control program.

What is claimed is:

1. A print controller comprising:
a reception unit that receives a plurality of print data sets for print jobs from a client device;
a storage unit that serially stores the print data in a spool region by print job;
a print data manager that associates the print data sets stored in the spool region with print management information that includes a predetermined condition;
a judgment unit that judges whether or not total data size of print data sets stored in the spool region exceeds a preset reference data size; and
a print data eraser that, when the judgment unit judges that the total data size exceeds the reference data size, selects a print data set according to the predetermined condition of the print management information associated with each print data set, and erases the selected print data set from the spool region.

2. A print controller as claimed in claim 1, wherein the judgment unit adds data size of each print data set stored in the spool region to calculate the total data size, and judges by comparing the total size with the reference data size.

3. A print controller as claimed in claim 1, wherein the judgment unit sets a reference data set number representing how many data sets are assumed to be required to match the reference data size, and judging whether the number of print data sets stored in the spool region exceeds the reference data set number.

4. A print controller as claimed in claim 1, wherein the print data manager associates the print data sets with spool time information in the print management information, the spool time information indicating spool time when each print data set was stored in the spool region, the print data eraser selecting a print data set with an earliest spool time according to the spool time information and erasing the selected print data set.

5. A print controller as claimed in claim 1, wherein the print data manager associates the print data sets with last print time information in the print management information, the last print time information indicating print time when a print operation was last performed for each print data set, the print data eraser selecting a print data set with an earliest print time according to the last print time information and erasing the selected print data set.

6. A print controller as claimed in claim 1, wherein the print data manager associates the print data sets with erasable time information in the print management information, the erasable time information designating erase times after which corresponding print data sets can be erased, the print data eraser selecting a print data set with an exceeded erase time or with an earliest erase time and erasing the selected print data.

7. A printing system comprising:
a client device for handling a plurality of print data sets for print jobs;
a print controller connected to the client device, wherein:
the client device includes a print data transmission unit for transmitting the plurality of print data sets to the print controller; and
the print controller includes:
a reception unit that receives the plurality of print data sets from the client device;
a storage unit that serially stores the print data in a spool region by print job;
a print data manager that associates the print data sets stored in the spool region with print management information that includes a predetermined condition;
a judgment unit that judges whether or not total data size of print data sets stored in the spool region exceeds a preset reference data size; and
a print data eraser that, when the judgment unit judges that the total data size exceeds the reference data size, selects a print data set according to the predetermined condition of the print management information associated with each print data set, and erases the selected print data set from the spool region.

8. A program storage medium capable of being read by a computer of a printing system that includes a client device and a print controller, the client device handling a plurality of print data sets for print jobs, the print controller being connected to the client device and controlling print processes using the plurality of print data sets, the program comprising:
a program of transmitting, from the client device, the plurality of print data sets to the print controller;
a program of receiving, at the print controller, the plurality of print data sets from the client device;
a program of serially storing the received print data sets by print job in a spool region of the print controller;
a program of associating the print data sets stored in the spool region with print management information that includes a predetermined condition;
a program of judging whether or not total data size of print data sets stored in the spool region exceeds a preset reference data size;
a program of selecting a print data set according to the predetermined condition of the print management information associated with each print data set when the judgment unit judges that the total data size exceeds the reference data size; and
a program of erasing the selected print data set from the spool region.

* * * * *